United States Patent
Kusakabe et al.

(10) Patent No.: US 6,363,455 B2
(45) Date of Patent: *Mar. 26, 2002

(54) APPARATUS AND METHOD FOR DATA PROCESSING EMPLOYING DATA BLOCKS AND UPDATING BLOCKS

(75) Inventors: Susumu Kusakabe, Kanagawa; Masayuki Takada, Tokyo, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,577

(22) Filed: Feb. 23, 1998

(30) Foreign Application Priority Data

Feb. 28, 1997 (JP) ............................... 9-062542

(51) Int. Cl.⁷ ................................ G06F 12/00
(52) U.S. Cl. .................. 711/103; 711/160; 711/165
(58) Field of Search ................. 711/103, 160, 711/159, 165

(56) References Cited

U.S. PATENT DOCUMENTS

| | | | |
|---|---|---|---|
| 5,175,418 A | 12/1992 | Tanaka | |
| 5,339,268 A | * 8/1994 | Machida | 365/49 |
| 5,362,954 A | 11/1994 | Komatsu | |
| 5,418,353 A | 5/1995 | Katayama et al. | |
| 5,530,801 A | 6/1996 | Kobayashi | |
| 5,530,834 A | * 6/1996 | Colloff et al. | 711/136 |
| 5,568,423 A | * 10/1996 | Jou et al. | 365/185.33 |
| 5,604,879 A | * 2/1997 | Beavers et al. | 711/207 |
| 5,963,970 A | * 10/1999 | Davis | 711/103 |
| 6,000,006 A | * 12/1999 | Bruce et al. | 711/103 |

FOREIGN PATENT DOCUMENTS

| | | |
|---|---|---|
| EP | 0 543 582 A1 | 5/1993 |
| FR | 2612668 | 9/1988 |
| FR | 0565389 | 10/1993 |
| FR | 2730833 | 8/1996 |

\* cited by examiner

Primary Examiner—Matthew Kim
Assistant Examiner—Matthew D. Anderson
(74) Attorney, Agent, or Firm—Bell, Boyd & Lloyd LLC

(57) ABSTRACT

To be able to maintain compatibility of a plurality of data even when a hazard is caused in the midst of writing the plurality of related data, a first region stores physical block numbers #00H through #03H of physical blocks constituting a data region respectively in correspondence with logical block numbers %00H through %03H, for example, when a request of writing data is made to the logical blocks %00H and %02H, the data are respectively written to, for example, physical blocks #04H and #05H which are updating blocks for updating data in physical blocks constituting the data region and block numbers #04H and #05H of the physical blocks are stored to a second region respectively in correspondence with the logical blocks %00H and %02H.

14 Claims, 27 Drawing Sheets

F I G. 19

| | NEWEST DETERMINING INFORMATION + PHYSICAL BLOCK NO. OF POINTER REGION (OBJECT BLOCK, UPDATING BLOCK), PHYSICAL BLOCK NO. OF UPDATING BLOCK OF DATA REGION |
|---|---|
| NEWEST EFFECTIVENESS DETERMINING BLOCK | PHYSICAL BLOCK NOS. #00 TO #1F |
| POINTER BLOCK | PHYSICAL BLOCK NOS. #20 TO #3F |
| POINTER BLOCK | PHYSICAL BLOCK NOS. #40 TO #5F |
| POINTER BLOCK | PHYSICAL BLOCK NOS. #60 TO #7F |
| POINTER BLOCK | PHYSICAL BLOCK NOS. #80 TO #9F |
| POINTER BLOCK | PHYSICAL BLOCK NOS. #A0 TO #BF |
| POINTER BLOCK | PHYSICAL BLOCK NOS. #C0 TO #DF |

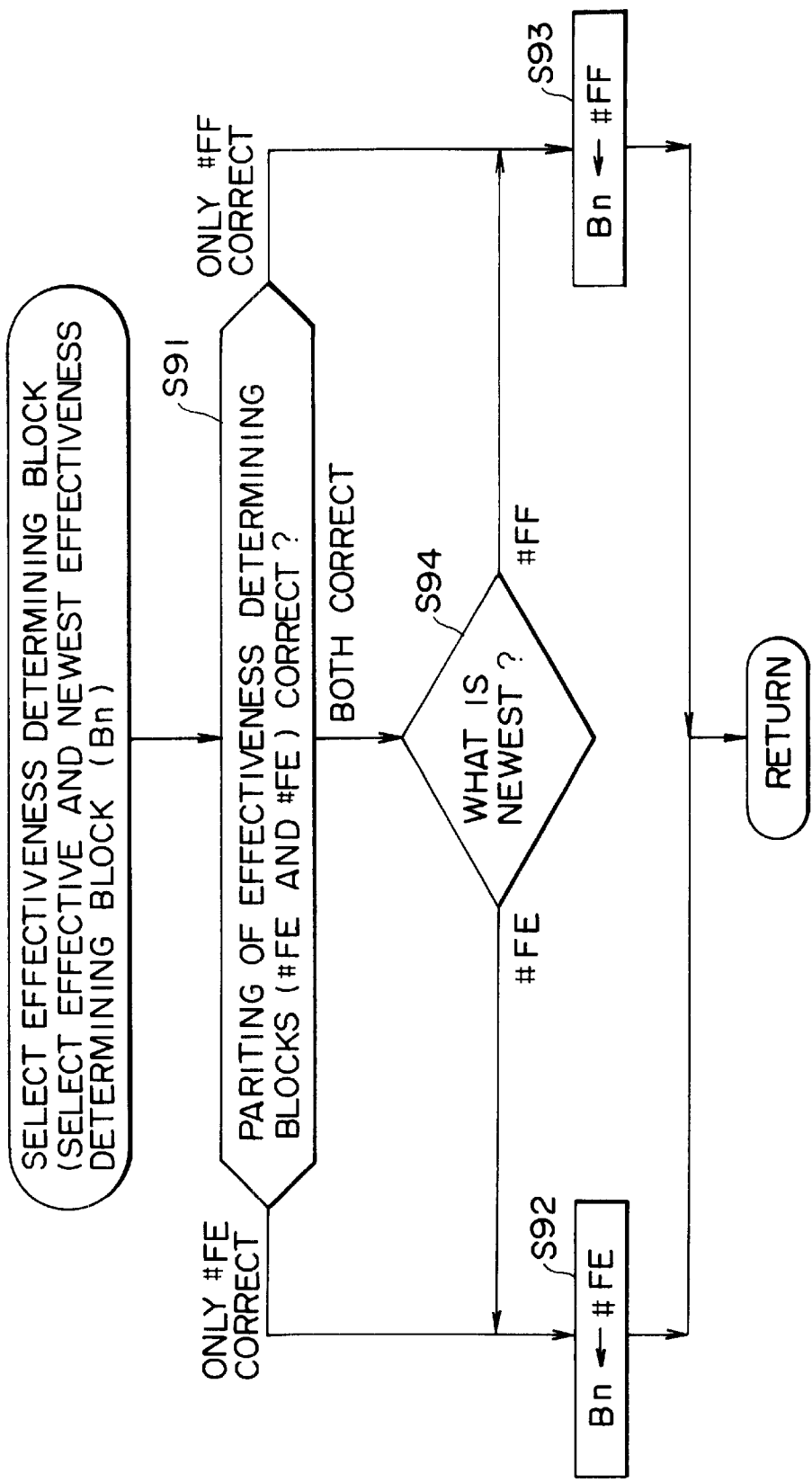

APPARATUS AND METHOD FOR DATA PROCESSING EMPLOYING DATA BLOCKS AND UPDATING BLOCKS

BACKGROUND OF THE INVENTION

1. Field of the Invention

The present invention relates to a data processing method and a data processing apparatus, particularly to a data processing method and a data processing apparatus preferably used in, for example, an IC (Integrated Circuit) card or the like where transmission and reception of data is carried out in a non-contact state.

2. Description of Related Art

There has been developed an IC card (smart card) which is expected to use in an electronic money system or a security system.

An IC card incorporates CPU (Central Processing Unit) for carrying out various kinds of processes and a memory for storing data or the like necessary for processing in which transmission and reception of data is carried out in a state where the IC card is brought into contact with a predetermined reader/writer (R/W).

Meanwhile, there is an IC card of a batteryless type having no battery of its own in IC card and power is supplied from R/W to such an IC card of a batteryless type.

Further, there is an IC card which carries out transmission and reception of data between the IC card and R/W in a non-contact state by using an electromagnetic wave and obtains necessary power by the electromagnetic wave.

However, in the case of carrying out transmission and reception of data between an IC card and R/W in a non-contact state, there poses a problem in which sufficient power cannot be provided when the reception state of electromagnetic wave is failed in the midst of making access to a memory incorporated in the IC card and a defect is caused in the compatibility of data in the memory (Memory Corruption is caused).

Further, when transmission and reception of data is carried out by bringing the IC card into contact with R/W, in the case where a user can freely insert or draw the IC card to or from R/W, if the IC card is drawn from R/W in the midst of making access to a memory, the memory corruption may also be caused.

In this case, when data is held at each unit (sector in the case of MS-DOS) for storing data as in, for example, FAT (File Allocation Table) of MS-DOS (Microsoft-Disc Operating System) (registered trademark), in the case where memory corruption is caused in FAT, all the positional information of data (file) is lost and access to data cannot be made.

Accordingly, when memory corruption is caused, in the worst case, an IC card cannot be used and therefore, some countermeasure is needed in respect of the memory corruption.

Furthermore, in the case of an IC card, data is read and written by a unit of a predetermined block and therefore, a plurality of related data may be written respectively to a plurality of blocks. That is, for example, when an IC card is used as an electronic money or the like for paying carfare, there may be a case where log (use history) is intended to store. Further, now, for example, when related information of station and time to get in train, station and time to get off train, fare between stations to get in and off train and the like are stored as a log, the related information may be written by dividing the information into a plurality of blocks.

Therefore, in such a case, it is necessary not only to deal with memory corruption in respect of a single block but deal with memory corruption when the memory corruption is caused in any of a plurality of blocks where the related data is written.

SUMMARY OF THE INVENTION

The present invention has been carried out in view of such a situation and the present invention can effectively deal with memory corruption.

According to a first aspect of the present invention of an information processing method, data to be written to one or more of the blocks in the data region in correspondence with the block numbers stored to either one region of the first and the second region, is written to one or more of updating blocks for updating data in the blocks constituting the data region and block numbers of blocks which have been the updating blocks to which the data has been written are stored to other of the first and the second region.

According to a second aspect of the present invention of an information processing apparatus, there are provided data writing means for writing data to be written to one or more of the blocks of the data region in correspondence with the block numbers stored to either one region of the first and the second region to one or more of updating blocks for updating data in the blocks constituting the data region, and block number writing means for storing the block numbers of the blocks which have been the updating blocks to which the data has been written to other of the first and the second region.

According to the first and the second aspects of the information processing method and the information processing apparatus, data to be written to one or more of the blocks in the data region in correspondence with the block numbers stored to either one region of the first and the second region, is written to one or more of updating blocks for updating data in the blocks constituting the data region and block numbers of blocks which have been the updating blocks to which the data has been written are stored to other of the first and the second region. Accordingly, memory corruption can be dealt with effectively not only in the case of writing data to one block but in the case of writing data to a plurality of blocks.

According to a third aspect of an information processing method, data to be written to one or more of the blocks of the data region in correspondence with the block numbers stored to the blocks of the block number region in correspondence with the block numbers stored to either one region of the first and the second region is written to one or more of updating blocks for updating data in the blocks constituting the data region, the block numbers of the blocks which have been the updating blocks of the data region to which the data has been written are written to updating blocks for updating the block numbers in the blocks constituting the block number region, and the block numbers of the blocks which have been the updating blocks in the block number region to which the block numbers have been written are stored to other of the first and the second region.

According to a fourth aspect of an information processing apparatus, there are provided data writing means for writing data to be written to one or more of the blocks of the data region in correspondence with the block numbers stored to the blocks of the block number region in correspondence with the block numbers stored to either one region of the first and the second region to one or more of updating blocks for updating data in the blocks constituting the data region, first block number writing means for writing the block numbers of the blocks which have been the updating blocks of the data region to which the data has been written to the updating blocks for updating block numbers in the blocks constituting the block number region, and second block number writing means for making other of the first and the second region store the block numbers of the blocks which have been the updating blocks of the block number region to which the block numbers have been written.

According to the third aspect of the data processing method and the fourth aspect of the data processing apparatus, data to be written to one or more of the blocks of the data region in correspondence with the block numbers stored to the blocks of the block number region in correspondence with the block numbers stored to either one region of the first and the second region is written to one or more of updating blocks for updating data in the blocks constituting the data region, the block numbers of the blocks which have been the updating blocks of the data region to which the data has been written are written to updating blocks for updating the block numbers in the blocks constituting the block number region, and the block numbers of the blocks which have been the updating blocks in the block number region to which the block numbers have been written are stored to other of the first and the second region. Accordingly, memory corruption can effectively be dealt with even in the case where data is written to further many blocks.

BRIEF DESCRIPTION OF THE DRAWINGS

FIG. 19 is a diagram showing store content of RAM 67;

FIG. 20 is a flowchart for explaining further details of a processing at step S81 of FIG. 18;

DETAILED DESCRIPTION OF THE PREFERRED EMBODIMENTS

Figure 1:
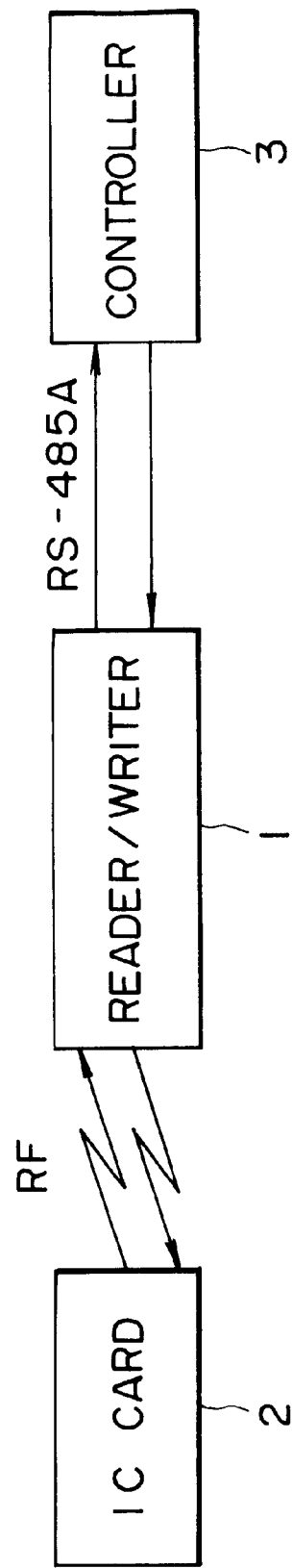
FIG. 1 is a block diagram showing an example of a constitution of an embodiment of a non-contact card system to which the present invention is applied.

FIG. 1 shows an example of a constitution of an embodiment of a non-contact card system to which the present invention is applied.

The non-contact card system is constituted by a reader/writer R/W 1, an IC card 2 and a controller 3 and transmission and reception of data is carried out between R/W 1 and the IC card 2 in a non-contact state by using an electromagnetic wave.

That is, R/W 1 transmits predetermined command to the IC card 2 and the IC card 2 receives the command and carries out a processing in correspondence with the command. Further, the IC card 2 transmits response data in correspondence with a result of the processing to R/W 1.

R/W 1 is connected to the controller 3 via a predetermined interface (for example, in conformity with Prescription RS-485A or the like) and the controller 3 makes R/W 1 perform predetermined processing by supplying a predetermined control signal to R/W 1.

Figure 2:
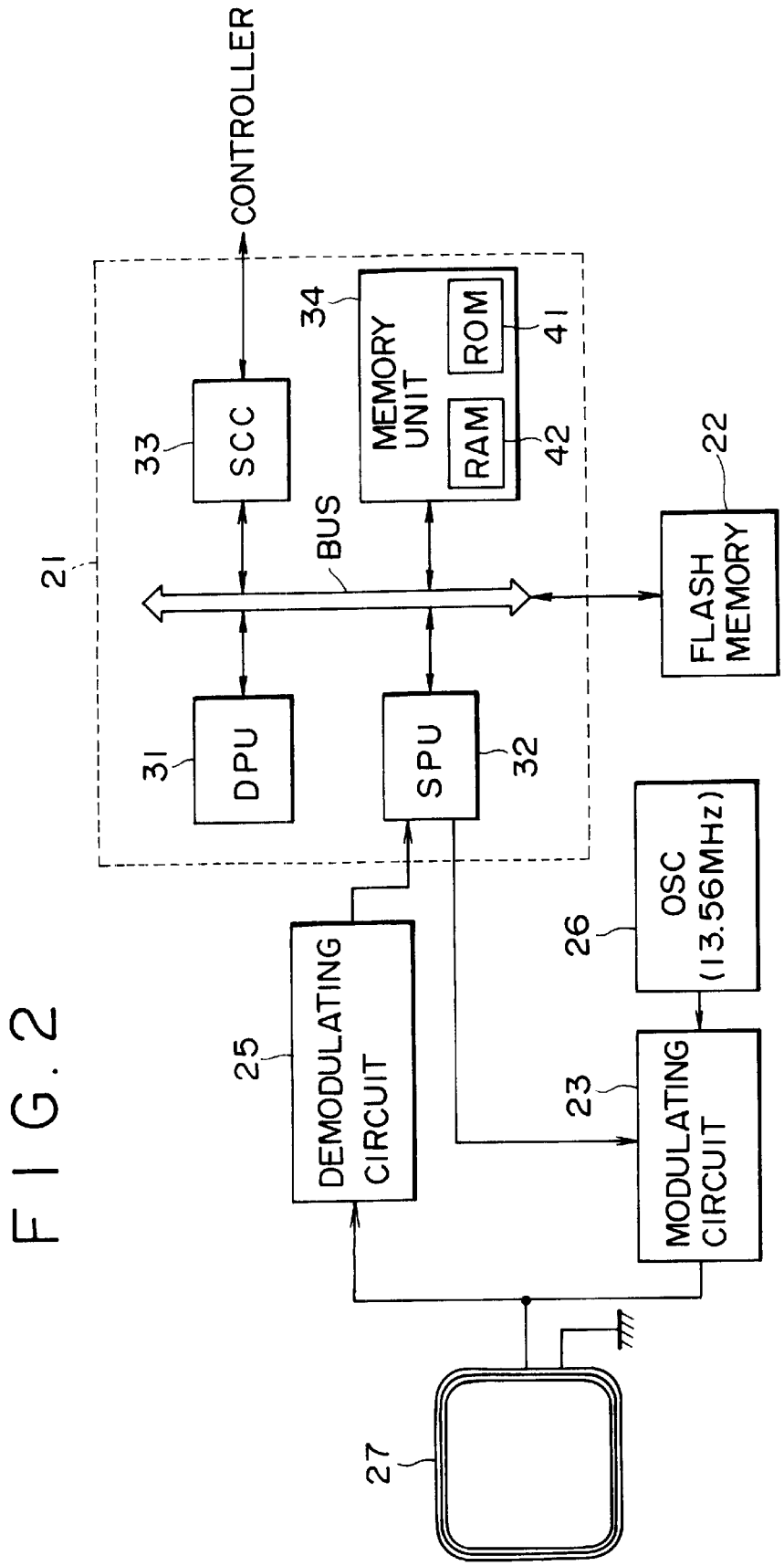
FIG. 2 is a block diagram showing an example of a constitution of a reader/writer 1 of FIG. 1.

FIG. 2 shows an example of a constitution of R/W 1 of FIG. 1.

In IC 21, DPU (Data Processing Unit) 31 for processing data, SPU (Signal Processing Unit) 32 for processing data transmitted to the IC card 2 and data received from the IC card 2, SCC (Serial Communication Controller) 33 for carrying out communication with the controller 3, and memory unit 34 constituted by ROM 41 previously storing information necessary for processing data and RAM 42 temporarily storing data in the midst of processing, are connected via a bus.

Further, also a flash memory 22 for storing predetermined data is connected to the bus.

DPU 31 outputs command for transmitting to the IC card 2 to SPU 32 and receives response data received from the IC card 2 from SPU 32.

SPU 32 carries out a predetermined processing (for example, BPSK (Biphase Shift Keying) modulation (coding to one chester code) and the like) in respect of command for transmitting to the IC card 2 and thereafter, outputs it to a modulating circuit 23 and receives response data transmitted from the IC card 2 from a demodulating circuit 25 and carries out predetermined processing in respect of the data.

The modulating circuit 23 modulates a carrier wave at a predetermined frequency (for example, 13.56 MHz) supplied from an oscillator 26 in ASK (Amplitude Shift Keying) modulation by data supplied from SPU 32 and outputs a formed modulated wave to the IC card 2 as an electromagnetic wave via an antenna 27. In this case, the modulating circuit 23 carries out ASK modulation with the modulation degree of 1 or less. That is, even when data is at a low level, the maximum amplitude of the modulated wave is prevented from being nullified.

The demodulating circuit 25 demodulates a modulated wave (ASK-modulated wave) received via the antenna 27 and outputs demodulated data to SPU 32.

Figure 3:
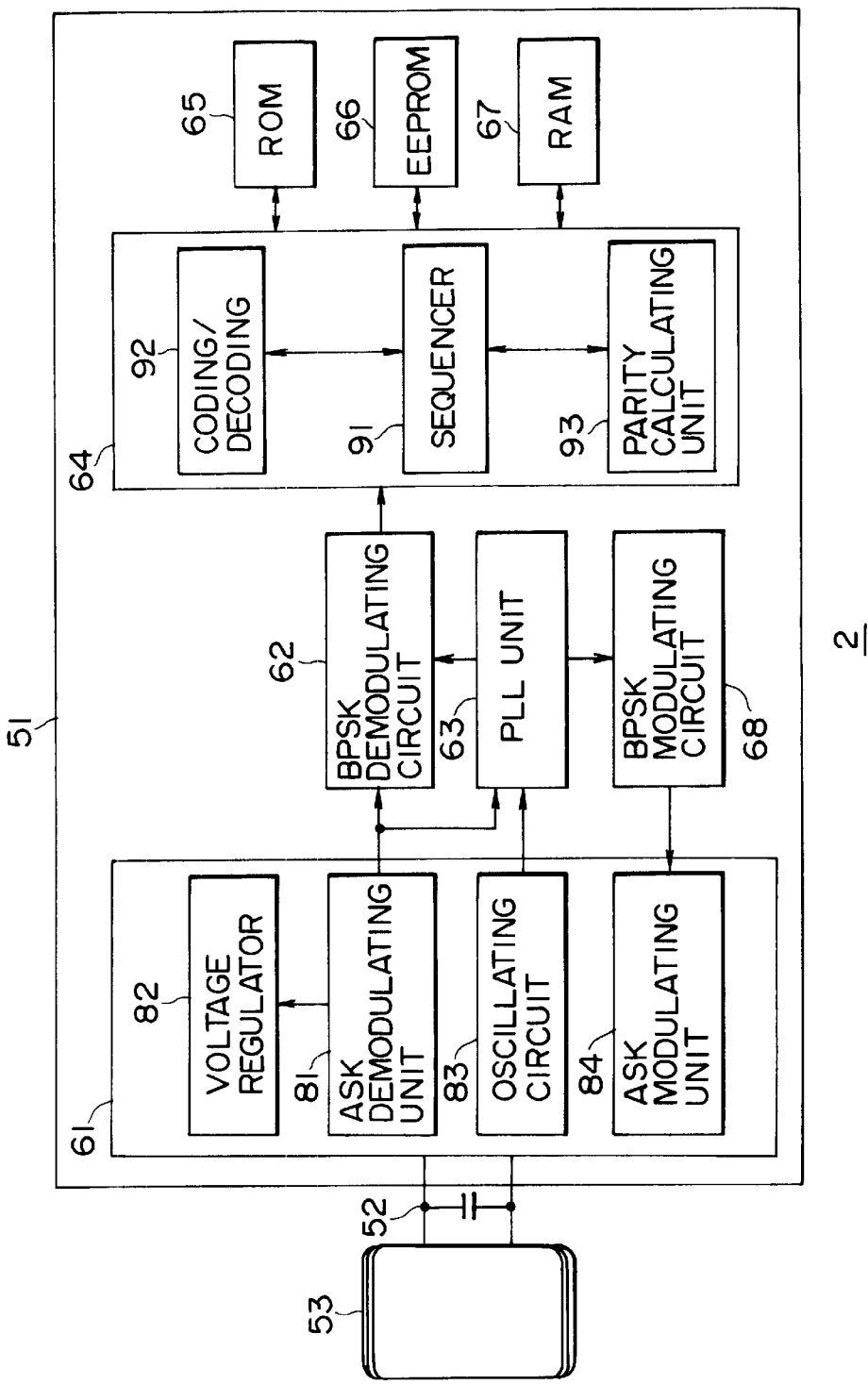
FIG. 3 is a block diagram showing an example of a constitution of an IC card 2 of FIG. 1.

FIG. 3 shows an example of a constitution of the IC card 2 of FIG. 1. According to the IC card 2, IC 51 receives a modulated wave transmitted from R/W 1. Further, a condenser 52 composes an LC circuit along with the antenna 53 and synchronizes (resonate) with an electromagnetic wave having a predetermined frequency (carrier frequency).

In an RF interface unit 61, an ASK demodulating unit 81 detects and demodulates a modulated wave (ASK-modulated wave) received via the antenna 53, outputs demodulated data to a BPSK demodulating circuit 62 and a PLL (Phase Locked Loop) unit 63 and a voltage regulator 82 stabilizes a signal detected by the ASK demodulating unit 81 and supplies the signal to various circuits as direct current power.

Further, in the RF interface unit 61, an oscillating circuit 83 oscillates a signal having a frequency the same as that of a clock frequency of data and outputs the signal to the PLL unit 63.

An ASK modulating unit 84 of the RF interface unit 61 varies load of the antenna 53 as power source of the IC card 2 in correspondence with data supplied from the calculating unit 64. For example, it can be realized by the procedure in which a predetermined switching element is made ON/OFF in correspondence with data and predetermined load is connected in parallel with the antenna 53 only when the switching element is made ON.

ASK modulating unit 84 modulates in ASK modulation modulated wave received via the antenna 53 and transmits the modulated component to R/W 1 via the antenna 53.

The PLL unit 63 forms a clock signal from data supplied from the ASK demodulating unit 81 in synchronism with the data and outputs the clock signal to a BPSK demodulating circuit 62 and a BPSK modulating circuit 68.

When data demodulated by the ASK demodulating unit 81 is modulated in BPSK modulation, the BPSK demodulating circuit 62 carries out demodulation (decoding of one chester code) of the data in accordance with the clock signal supplied from the PLL unit 63 and outputs demodulated data to the calculating unit 64.

When data supplied from the BPSK modulating circuit 62 is encrypted, the calculating unit 64 decodes the data at an encoder/decoder unit 92 and processes the data at a sequencer 91 (data writing means) (block number writing means) (first and second block number writing means). Further, when the data is not encrypted, data supplied from the BPSK demodulating circuit 62 is directly supplied to the sequencer 91 without being processed by the encoder/decoder unit 92.

The sequencer 91 carries out a processing in correspondence with data as command supplied thereto. That is, for example, the sequencer 91 writes or reads data to or from EEPROM 66 (storing means).

A parity calculating unit 93 of the calculating unit 64 calculates Reed-Solomon code as a parity from data for storing to ROM 65 or data stored to EEPROM 66.

Further, after carrying out predetermined processing at the sequencer 91, the calculating unit 64 outputs response data in correspondence with the processing (data for transmitting to R/W 1) to the BPSK modulating circuit 68.

The BPSK modulating circuit 68 modulates data supplied from the calculating unit 64 in BPSK modulation and outputs modulated data to the ASK modulating unit 84 of the RF interface unit 61.

ROM 65 stores processing programs to be carried out by the sequencer 91 or other necessary data. RAM 67 temporarily stores data or the like in the midst of processing when the sequencer 91 caries out processes.

EEPROM (Electrically Erasable and Programmable ROM) 66 is a nonvolatile memory and is constituted to continue storing data even after the IC card 2 has finished communication with R/W 1 and supply of power has been stopped.

Next, an explanation will be given of transmission and reception processing of data between R/W 1 and the IC card 2.

R/W 1 (FIG. 2) irradiates a predetermined electromagnetic wave from the antenna 27, monitors load state of the antenna 27 and awaits until change of the load state is detected by approach of the IC card 2. Incidentally, in this case, R/W 1 may carry out a processing (polling) of repeating to irradiate an electromagnetic wave which is modulated in ASK modulation by data having a predetermined short pattern and call the IC card 2 at constant time intervals until response from the IC card 2 is provided.

In respect of R/W 1, when approach of the IC card 2 is detected, SPU 32 of R/W 1 carries out BPSK modulation by data (command in correspondence with processing for making the IC card 2 execute, data written to the IC card 2 or the like) with a rectangular wave having a predetermined frequency (for example, frequency twice as much as clock frequency of data) as a carrier and outputs a formed modulated wave to the modulating circuit 23.

Incidentally, in BPSK modulation, data can be made to correspond to a change in the phase of the modulated wave by using differential conversion. In this case, consideration needs not to be paid to the polarity of the modulated wave in the demodulating operation since even when a BPSK-modulated signal is reverted, the signal is demodulated to original data.

The modulating circuit 23 carries out ASK modulation with respect to the predetermined carrier wave by the modulation degree (=maximum amplitude of data signal/ maximum amplitude of carrier wave) of less than 1 (for example, 0.1) and transmits a formed modulated wave (ASK-modulated wave) to the IC card 2 via the antenna 27.

Further, when the transmission is not carried out, the modulating circuit 23 is constituted to form a modulated wave by, for example, high level in two levels (high level and low level) of a digital signal.

In respect of the IC card 2 (FIG. 3), a portion of the electromagnetic wave irradiated from the antenna 27 of R/W 1 is converted into an electric signal in the LC circuit constituted by the antenna 53 and the condenser 52 and the electric signal (modulated wave) is outputted to the RF interface 61 of IC 51. Further, the ASK demodulating unit 81 of the RF interface 61 carries out envelop detection by rectifying and smoothing the modulated wave, supplies a signal formed thereby to the voltage regulator 82, extracts a data signal by restraining a direct current component of the signal and outputs the data signal to the BPSK demodulating circuit 62 and the PLL unit 63.

The voltage regulator 82 stabilizes the signal supplied from the ASK demodulating unit 81, forms direct current power and supplies it to various circuits.

Further, in this case, a terminal voltage V0 of the antenna 53 is represented by, for example, the following equation.

$$V0 = V10(1 + k \times Vs(t)) \cos(\omega t)$$

where $V10 \cos(\omega t)$ represents the carrier wave, notation k designates the modulation degree and Vs (t) represents data outputted from SPU 32, respectively.

Further, a value VLR at the low level of a voltage V1 which has been rectified by the ASK demodulating unit 81, is represented by, for example, the following equation.

$$VLR = V10(1 + k \times (-1)) - Vf$$

In this equation, notation Vf designates voltage drop at a diode constituting a rectifying circuit for carrying out rectification and smoothing in the ASK demodulating unit 81 and is generally about 0.7 volt.

Upon receiving a signal which has been rectified and smoothed by the ASK demodulating unit 81, the voltage regulator 82 stabilizes the signal and supplies it as direct current power to various circuits starting from the calculating unit 64. Incidentally, voltage variation (difference between high level and low level) after rectification is small since the demodulation degree "k" of the demodulated wave is less than 1. Accordingly, the voltage regulator 82 can easily form the direct current power.

For example, when a modulated wave having the modulation degree "k" of 5% is received with V10 of 3 volt or higher, the low level voltage VLR after rectification is 2.15 (=3×(1−0.05)−0.7) volt or higher and therefore, the voltage regulator 82 can supply the sufficient voltage as power source to various circuits. Further, in this case, the amplitude 2×k×V10 (Peak to Peak value) of an alternating current component (data component) of the voltage V1 after rectification is 0.3 (=2×0.05×3) volt or higher and accordingly, the ASK demodulating unit 81 can demodulate data with a sufficiently high S/N ratio.

In this way, communication with low error rate (in a high S/N ratio state) can be carried out by using the ASK-modulated wave having the modulation degree "k" of 1 or less and direct current voltage which is sufficient as power source is supplied to the IC card 2.

Upon receiving data signal (BPSK-modulated signal) from ASK demodulating unit 81, the BPSK demodulating circuit 62 demodulates the data signal in accordance with a clock signal supplied from the PLL unit 63 and outputs modulated data to the calculating unit 64.

When data supplied from the BPSK demodulating circuit 62 is encrypted, the calculating unit 64 decodes the data at the encoder/decoder unit 92 and supplies the data (command) to the sequencer 91. Further, during this period, that is, after having transmitted the data to the IC card 2, R/W 1 awaits during a time period until receiving response thereto, while having sent data having a value of 1. Therefore, during this period, the IC card 2 receives a modulated wave having a constant maximum amplitude.

After having finished processing, the sequencer 91 outputs data (data for transmitting to R/W 1) in respect of a result of the processing or the like to the BPSK modulating circuit 68. Similar to SPU 32 of R/W 1, the BPSK modulating circuit 68 modulates the data in BPSK modulation (coding to one chester code) and thereafter, the circuit outputs the data to the ASK modulating unit 84 of the RF interface unit 61.

Further, the ASK modulating unit 84 modulates in ASK modulation the received modulated wave in accordance with data to be transmitted by varying the load connected to both ends of the antenna 53 by utilizing a switching element, by which the terminal voltage of the antenna 27 of R/W 1 is varied and the data is transmitted to R/W 1.

Meanwhile, the modulating circuit 23 of R/W 1 continues transmitting the data having the value of 1 (high level) in receiving data from the IC card 2. Further, data transmitted by the IC card 2 is detected at the demodulating circuit 25 from very small variation of terminal voltage (for example, several tens microvolts) in the terminal voltage of the antenna 27 electromagnetically coupled to the antenna 53 of the IC card 2.

Further, a detected signal (ASK-modulated wave) is modulated by being amplified by an amplifier having a high gain and digital data obtained as a result of demodulation is outputted to SPU 32 in the demodulating circuit 25. SPU 32 demodulates the data (BPSK-modulated signal) and outputs it to DPU 31. DPU 31 processes the data from SPU 32 and determines whether communication is to be finished in accordance with a result of the processing. Further, when it is determined that the communication is to be performed again, similar to the above-described case, communication is carried out between R/W 1 and the IC card 2. Meanwhile, when it is determined that communication is to be finished, R/W 1 finishes communication processing with the IC card 2.

As described above, R/W 1 transmits data to the IC card 2 by utilizing ASK modulation having the modulation degree "k" of less than 1 and transmits the data to the IC card 2 and the IC card 2 receives the data, carries out a processing in correspondence with the data and returns data in correspondence with a result of the processing to R/W 1.

Next, an explanation will be given of reading and writing processing of data in respect of EEPROM 66 by the sequencer 91 of the IC card 2 (FIG. 3) before which an explanation will be given of a method of dealing with memory corruption according to the present invention as preparation of the fore stage.

First, an explanation will be given of the basic principle of a method of dealing with memory corruption.

For example, now, in respect of the memory, reading and writing of information is assumed to carry out by a predetermined block unit and consider a case where data stored to a certain block B1 is updated.

When new data is written (overwritten to already stored data) to the block B1 per se, in the case where supply of power to the IC card becomes deficient in the midst of writing operation, the new data cannot be written completely. The data stored to the block B1 is destructed by which memory corruption is caused. Accordingly, when memory corruption is caused in the case where the new data to be written to the block B is being actually written to the block B1, the system cannot deal therewith. For example, in the case where data stored to the block B1 is balance of electronic money, new shopping is conducted and the sum subtracted by the bill is written as new data through the above-described method, when memory corruption is caused, the IC card cannot be used.

Hence, the new data to be written to the block B1 is written to a block B2 different from the block B1. In this way, although in the case where memory corruption is caused in the midst of writing the new data to the block B2, the new data cannot be written completely and the effectiveness cannot be guaranteed, at least, data stored to the block B1 can be prevented from being destructed.

Further, when new data is further supplied, the data is written to a block different from the block B2 (for example, the block B1). In this way, in the case where new data is supplied, the new data is written to a block other than a block to which data that has been written at a preceding time is stored by which, at least, the data that is written at the preceding time is prevented from being destructed by writing the new data whereby the IC card is prevented from being unable to use even in the worst case.

Next, an explanation will be given of a method of reading and writing data to and from a memory to which the above-described basic principle is applied in reference to FIGS. 4A and 4B.

According to FIGS. 4A and 4B, 1 block is constituted by 11 bytes where 1 byte (8 bits) of newest information, 8 bytes of data and 2 bytes of effectiveness information are successively arranged from the front end. However, the number of bits of 1 block, and the numbers of bits allocated to newest information, data and effectiveness information are not particularly limited to the above-described.

The newest information indicates the newness (newest feature) of store content of the block and, for example, absolute date and time, sequential number or the like can be used. That is, when absolute date and time is used, in the case where date and time of storing data is stored as a newest information, the newest block storing data can be detected by the newest information. Further, when a sequential number is used, in the case where, for example, an incremented number is stored as the newest information at every time of writing data, a value having the largest value is the newest one of writing data.

In this case, it is sufficient if it can be recognized which one of at least two blocks is new. The newest information may be able to represent at least three states. For example, now, when 3 values of 0, 1 and 2 are assumed to use as the newest information capable of representing three states, at every time of writing data to either of two blocks, 0, 1, 2, 0, aaa may be determined as the newest information of a block to which data is written. In this case, when the newest information of two blocks is 0 and 1, the block having 1 is newer, when they are 1 and 2, the block having 2 is newer, and when they are 2 and 0, the block having 0 is newer. When 3 values of 0, 1 and 2 are used as the newest information in this way, the number of bits is sufficient with 2 bits. Otherwise, for example, as the newest information, 3 of flags each having 1 bit may be used, and the flag standing for the bit may successively be changed at every time of writing data to the block.

In this case, in the following, as the newest information, 3 values of 0, 1 and 2 will be used.

Next, the effectiveness information indicates, so to speak, the effectiveness (effective or ineffective) of the newest information and data concerning whether writing of the newest information and the data of the block has normally been finished, and, for example, RS (Reed-Solomon) code or the like may be used.

Further, the effectiveness information is not limited to an error correction code of RS code or the like. For example, the effectiveness information may be parity that is calculated while writing the newest information and the data or may be a flag of 1 bit that is added after normally writing the newest information and the data.

In FIGS. 4A and 4B, the memory is provided with two blocks of a first and a second region. FIG. 4A shows a behavior where data 01H through 08H (H represents a hexadecimal number) have already been stored to the block of the first region and 8 data FFH have already been stored to the block of the second region, respectively.

For example, 11H through 18H are assumed to supply as new data to be written, firstly, the effectiveness of the two blocks of the first and the second regions is determined in reference to the effectiveness information. Further, in this case, either of the block is assumed to be effective.

When both of the two blocks are effective, which one is newer is determined in reference to the newest information. In FIG. 4A, the newest information of the block of the first or the second region is designated by 01H or 00H, respectively and accordingly, the block of the first region is newer.

In the case of writing new data, as described above, in order to prevent data which has been written in the preceding time from being destructed, the new data is written to a block that is not the newest block. Accordingly, in this case, as shown by, for example, FIG. 4B, data 11H through 18H are written to a block of the second region. After finishing to write data 11H through 18H, firstly, the newest information of the block to which the data have been written is updated. That is, the newest information of the block of the first region which has been the newest block is designated by 10H and accordingly, the newest information of the block of the second region to which the data is written now, is designated by 02H that is produced by incrementing 01H by 1.

Finally, the effectiveness information representing the effectiveness of data 11H through 18H and the newest information 02H is written to the block of the second region.

Next, a further explanation will be given of the processing of reading and writing data to and from the memory having the constitution shown by FIG. 4 in reference to flowcharts of FIG. 5 and FIG. 6.

First, an explanation will be given of the processing of reading in reference to the flowchart of FIG. 5.

Firstly, in step S1, by referring to the effectiveness information of the first and the second regions, the effectiveness is determined. When only the block of the first region is determined to be effective in step S1, that is, when the block of the first region is effective and the block of the second region is ineffective, the operation proceeds to step S2. In step S2, data is read from the first region that is the effective block and the processing is finished. Further, when only the block of the second region is determined to be effective in step S1, that is, when the block of the first region is ineffective and the block of the second region is effective, the operation proceeds to step S3, data is read from the second region that is the effective block and the processing is finished.

In the meantime, when both of the blocks of the first and the second regions are determined to be effective in step S1, the operation proceeds to step S4 where the newest feature is determined by referring to the newest information of the blocks of the first and the second regions. When the first region is determined to be newer than the second region in step S4, the operation proceeds to step S2, data is read from the block of the first region that is the newer one and the processing is finished. Further, when the second region is determined to be newer than the first region, the operation proceeds to step S3, data is read from the block of the second region that is the newer one and the processing is finished.

Next, an explanation will be given of the processing of writing in reference to the flowchart of FIG. 6.

Figure 5:
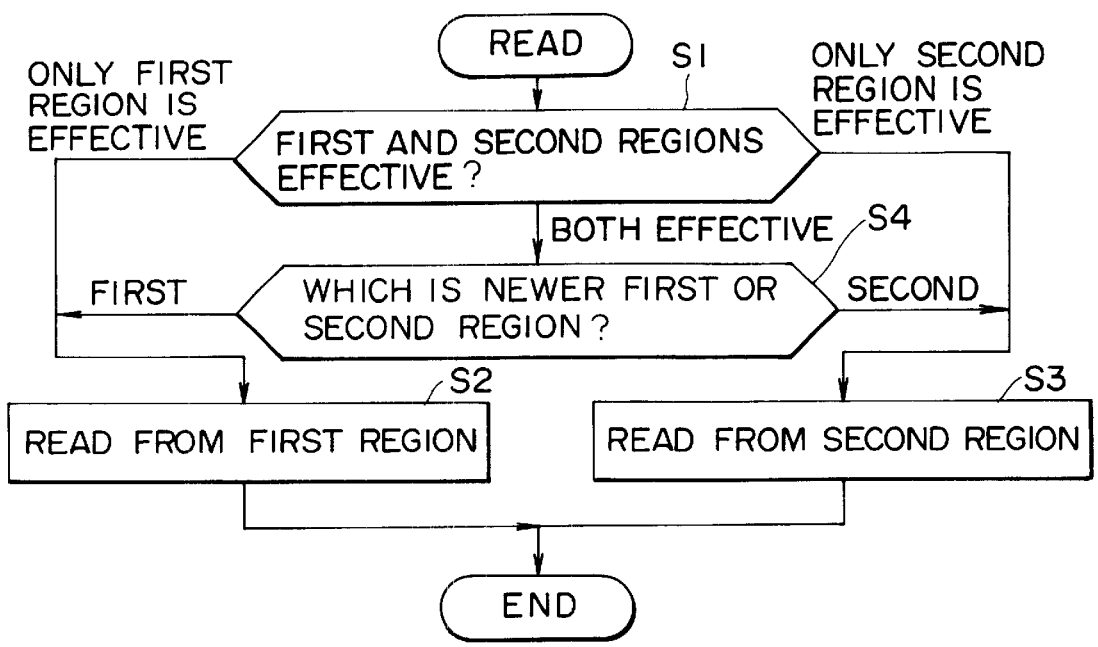
FIG. 5 is a flowchart for explaining reading processing in respect of a memory having a constitution shown by FIG. 4.
Figure 6:
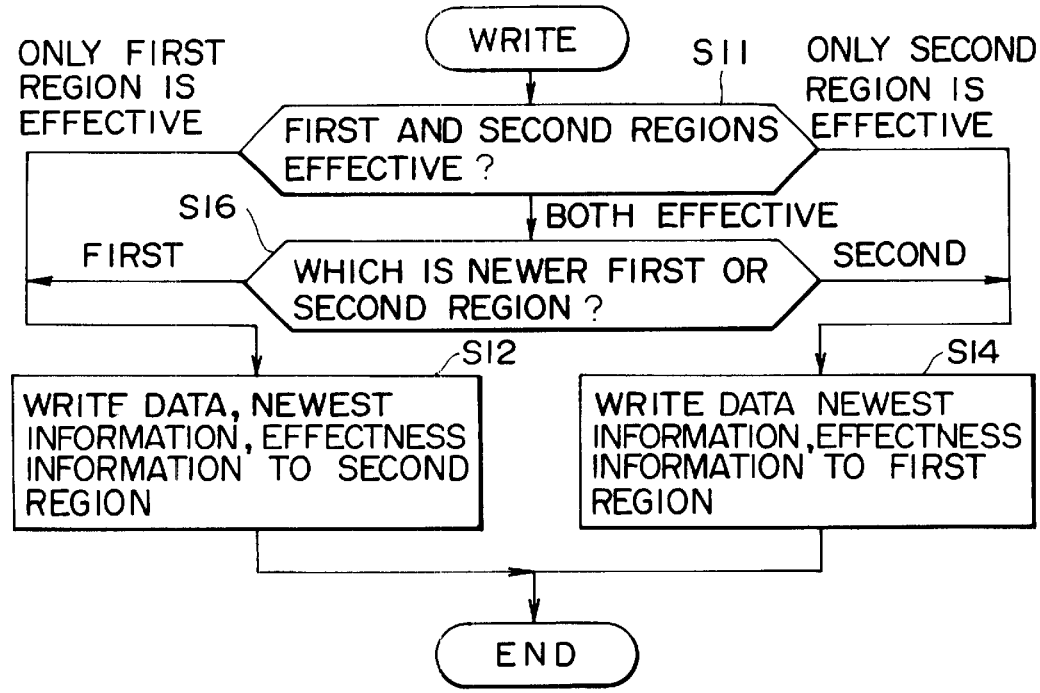
FIG. 6 is a flowchart for explaining writing processing in respect of the memory having the constitution shown by FIG. 4.

In this case, the effectiveness is determined at step S11 similar to the case of step S1 in FIG. 5. When only the block of the first region is determined to be effective, the operation proceeds to step S12, the data, the newest information and the effectiveness information which have been updated are written to the second region that is the ineffective block and the processing is finished. Further, when only the block of the second region is determined to be effective in step S11, the operation proceeds to step S14, the data, the newest information and the effectiveness information which have been updated are written to the first region that is the ineffective block and the processing is finished.

In the meantime, when both of the blocks of the first and the second regions are determined to be effective in step S11, the operation proceeds to step S16 and the newest feature of the blocks of the first and the second regions is determined similar to the case of step S4 in FIG. 5. When the first region is determined to be newer than the second region in step S16, the operation proceeds to step S12 and the data, the newest information and the effectiveness information are written to the blocks of the second region that is the older one, as described above in order to maintain the first region that is the newer one. Further, when the second region is determined to be newer than the first region in step S16, the operation proceeds to step S14 and the data, the newest information and the effectiveness information are written to the blocks of the first region that is the older one, as described above to maintain the block of the second region that is the newer one.

Further, the two blocks of the first and the second regions are recognized from outside as a logical block that is the same logical block. That is, the blocks of the first and the second regions are physical blocks which are physically existing blocks and the respective physical blocks are allocated with physical block numbers which are unique numbers for identification thereof. Further, the physical block numbers of the physical blocks of the first and the second regions are in correspondence with the same number as a logical block number for identifying the logical block. Thereby, the physical blocks of the first and the second regions are recognized as a single logical block from outside.

That is, in FIGS. 4A and 4B, although the physical block numbers of the physical blocks of the first and the second regions are different from each other, the same logical block number is allocated to either of them. Access is requested to make from outside to the logical block having such a logical block number. Further, on the side of the memory, when a request of access to a logical block is made, reading or writing processing which has been explained in reference to FIG. 5 or FIG. 6 is respectively carried out for blocks having physical block numbers in correspondence with the logical block, that is, for the first and the second regions.

Further, in the following, either of the physical block number and the logical block number is assumed to represent by 1 byte.

Next, in the above-described case, after finishing to write data to one physical block, the newest information and the effectiveness information of the physical block are updated. Therefore, when a plurality of related data are written to a plurality of physical blocks, a mixture of new and old data may be caused. That is, when memory corruption is caused in the midst of writing a plurality of data to a plurality of logical blocks, in view from outside, although new data exists in a logical block to which the new data has been written before causing the memory corruption, old data exists in a range from a logical block where the memory corruption has been caused to logical blocks to which the new data were to be written when the memory corruption had not been caused.

In the case where the plurality of related data are meaningful as a total thereof and accordingly, the total thereof is useful, as described above, when new ones and old ones are mixed in the plurality of related data, the compatibility cannot be established. That is, for example, in the case where the plurality of related data are station and time to get in train, station and time to get off train, fare between stations to get in and off train and the like as mentioned above, when new data is written with respect to the station to get off a train and old data remains with respect to the time to get in the train, the compatibility cannot be established and the data becomes meaningless.

When memory corruption is caused in the case where plurality of related data are written to a plurality of logical blocks before the plurality of data has been finished writing, it is necessary to make all the old ones of the plurality of related data exist in the logical blocks in view from outside.

Figure 7:
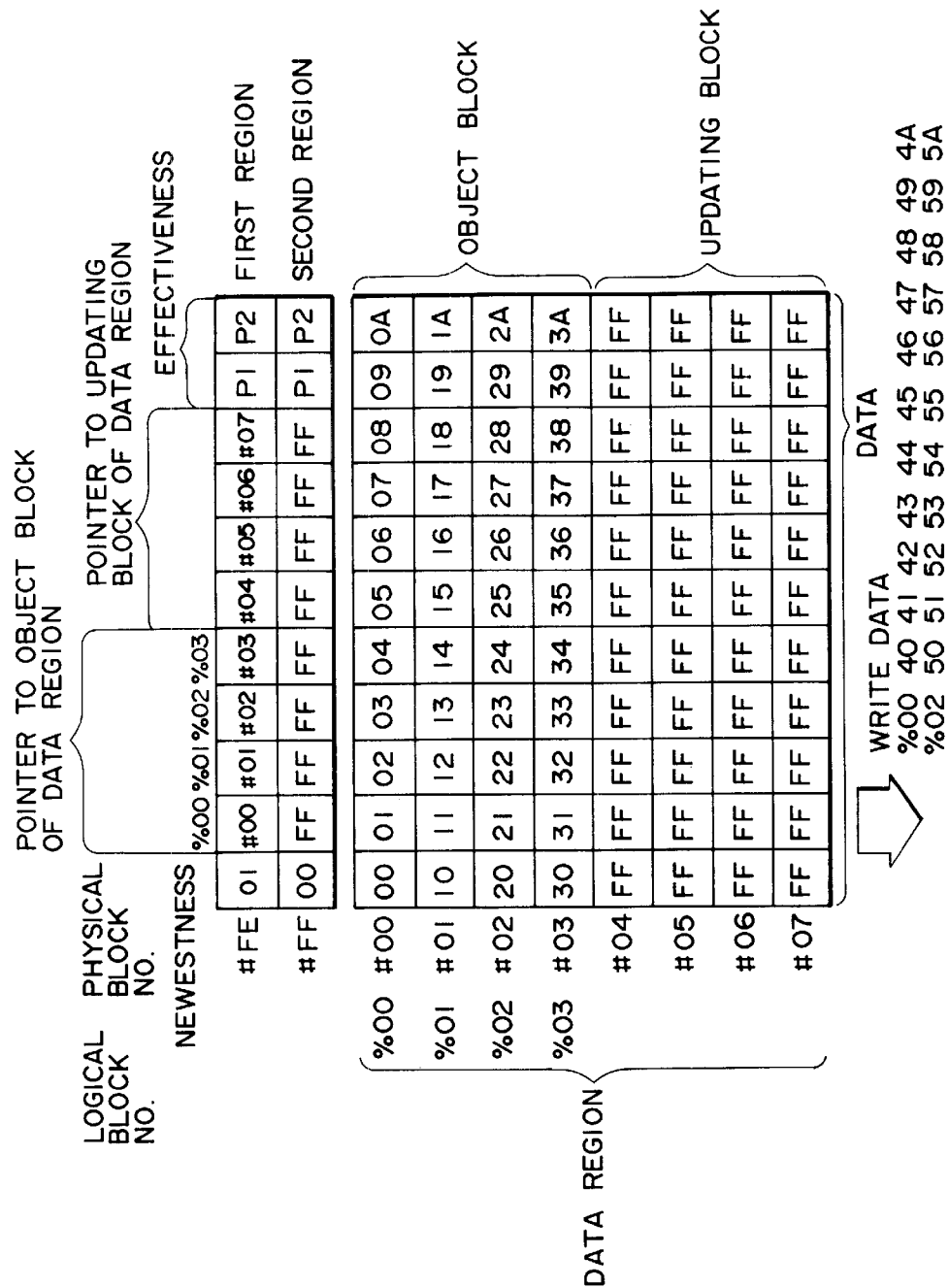
FIG. 7 is a diagram showing an example of a constitution of a memory to which the single pointer system is applied.

Hence, a memory is constituted as shown by, for example, FIG. 7.

That is, a memory is constituted by physical blocks as data regions for storing data and physical blocks of a first and a second region for storing physical block numbers of the physical blocks constituting the data regions.

Figure 4:
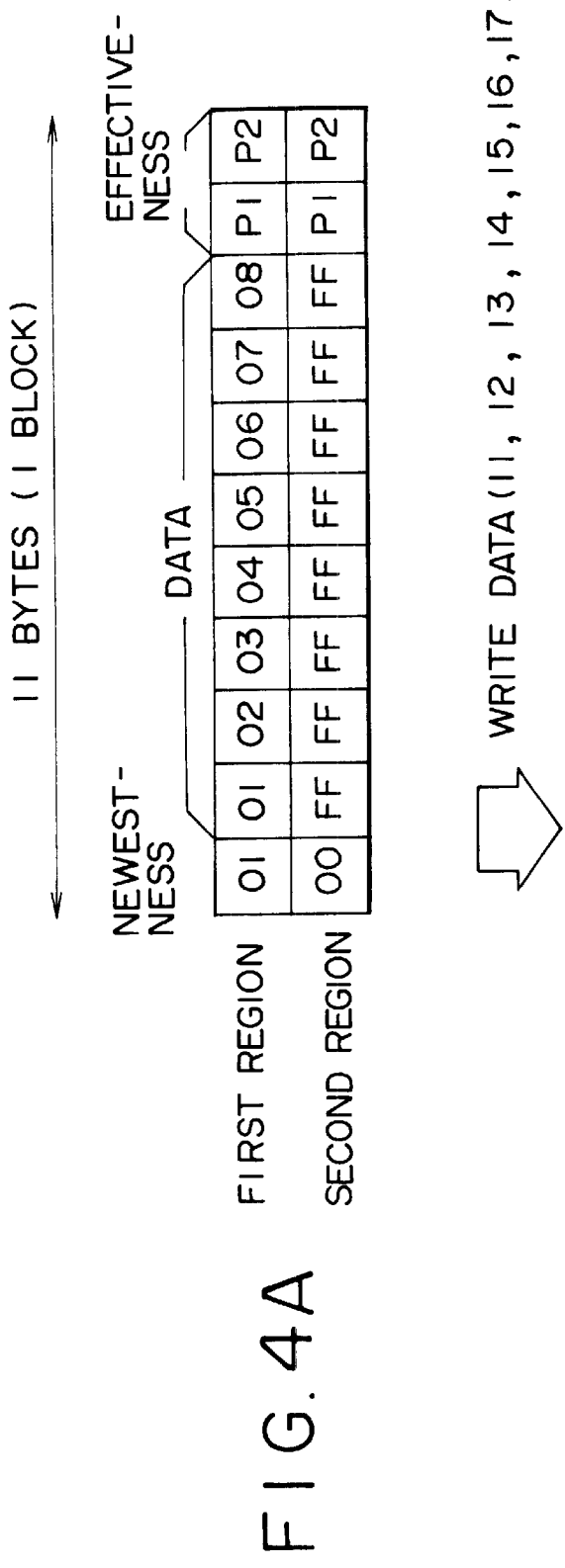
FIGS. 4A and 4B are diagrams for explaining the basic principle of the present invention.

Further, also in FIG. 7, similar to the case of FIG. 4, one physical block is constituted by 11 bytes.

The respective physical blocks constituting the data region are constituted to store data by a unit of 11 bytes and in FIG. 7, the data region is constituted by 8 of physical blocks respectively allocated with #00H through #07H as physical block numbers (notation # represents a physical block number).

Further, in this case, in view from outside, 4 logical blocks are seen, and notations %00H through %03H are allocated to respectives of the four logical blocks as logical block numbers. Incidentally, in the state shown by FIG. 7, the logical block numbers %00H through %03H are made to correspond respectively to the physical block numbers #00H through #03H.

The, physical blocks of the first and the second regions have in common with those in the case of FIG. 4 in view of the fact that front 1 byte is allocated to the newest information and last 2 bytes are allocated to the effectiveness information, respectively. However, the physical block numbers of the physical blocks in the data region, that is, pointers for the physical blocks constituting the data region are arranged at 8 bytes between the newest information and the effectiveness information.

Among 8 bytes between the newest information and the effectiveness information in the first and the second regions, physical block numbers of object blocks of the data region are arranged at a former half of 4 bytes and physical block numbers of updating blocks of the data region are arranged at a latter half of 4 bytes.

In this case, an object block signifies a physical block originally to become an object of writing in writing information. That is, for example, as mentioned above, when data stored to the block B1 is rewritten to new data, according to the present invention, the new data is written to the block B2, and in this case, the block B1 originally to be written with the new data in the conventional case corresponds to the object block.

Further, the updating block signifies a physical block for updating which is used when information is written to a physical block and store content thereof is updated. That is, for example, when data stored to the block B1 is rewritten to new data, the block B2 actually written with the new data corresponds to the updating block.

4 physical block numbers arranged at 4 bytes of a former half of 8 bytes between the newest information and effectiveness information in the first and the second regions, are made to correspond to the logical block numbers. For example, the physical block numbers arranged at a 1st through 4th byte thereof are made to correspond to the logical block numbers %00H through %03H, respectively.

In FIG. 7, the physical block number of the first or the second region is respectively designated by notation #FE or #FF.

According to the memory constituted as described above, in FIG. 7, four related data are stored to physical blocks #00H (physical block having a physical block number of #00H) through #03H and physical block numbers thereof #00H through #03H are arranged in this order at a former half of 4 bytes among 8 bytes between the newest information and the effectiveness information at the first region (hereinafter, pertinently referred to as a column of pointers for object blocks in data region).

For example, when attention is paid to the first region, respectives of the physical block numbers #00H through 03H are made to correspond to the logical block numbers %00H through %03H.

In this case, when attention is paid to the first region, any one of the physical blocks #00H through #03H which are made to correspond to the logical blocks %00H through %03H, constitutes a block that is to be an object of access, that is, an object block.

The updating block can be a physical block which does not constitute an object block at the time point, or, so to speak, a vacant region. Accordingly, in FIG. 7, when attention is paid to the first region, the physical blocks #04H through #07H can be updating blocks. Physical block numbers #04H through #07H of the updating blocks are arranged at a latter 4 bytes among 8 bytes between the newest information and the effectiveness information at the first region (hereinafter, pertinently referred to as a column of pointers for updating blocks of data region).

For example, when only the first region as one region of the first and the second regions, is assumed to be effective and a request of writing related two data is assumed to be made from outside to respectives of the logical blocks in correspondence with the logical block numbers %00H and %02H.

In this case, by referring to the column of pointers for the object blocks of the data region in the effective first region, the physical block numbers #00H and #02H in correspondence with the logical block numbers %00H and %02H are recognized and the physical blocks #00H and #02H are recognized as the object blocks to which the respectives of the related two data are to be written.

Further, by referring to the column of pointers for the updating blocks of the data region in the first region, physical block numbers #04H and #05H of the updating blocks having a number the same as the number of the object blocks, are recognized. Incidentally, the physical block numbers of the updating blocks are recognized, for example, successively from the one arranged to the left of the column of pointers for the updating blocks of the data region.

Further, two data which are originally to be written to the physical block #00H and #02H which are the object block, are written to respectives of the physical block #04H and #05H which are the updating block.

Figure 8:
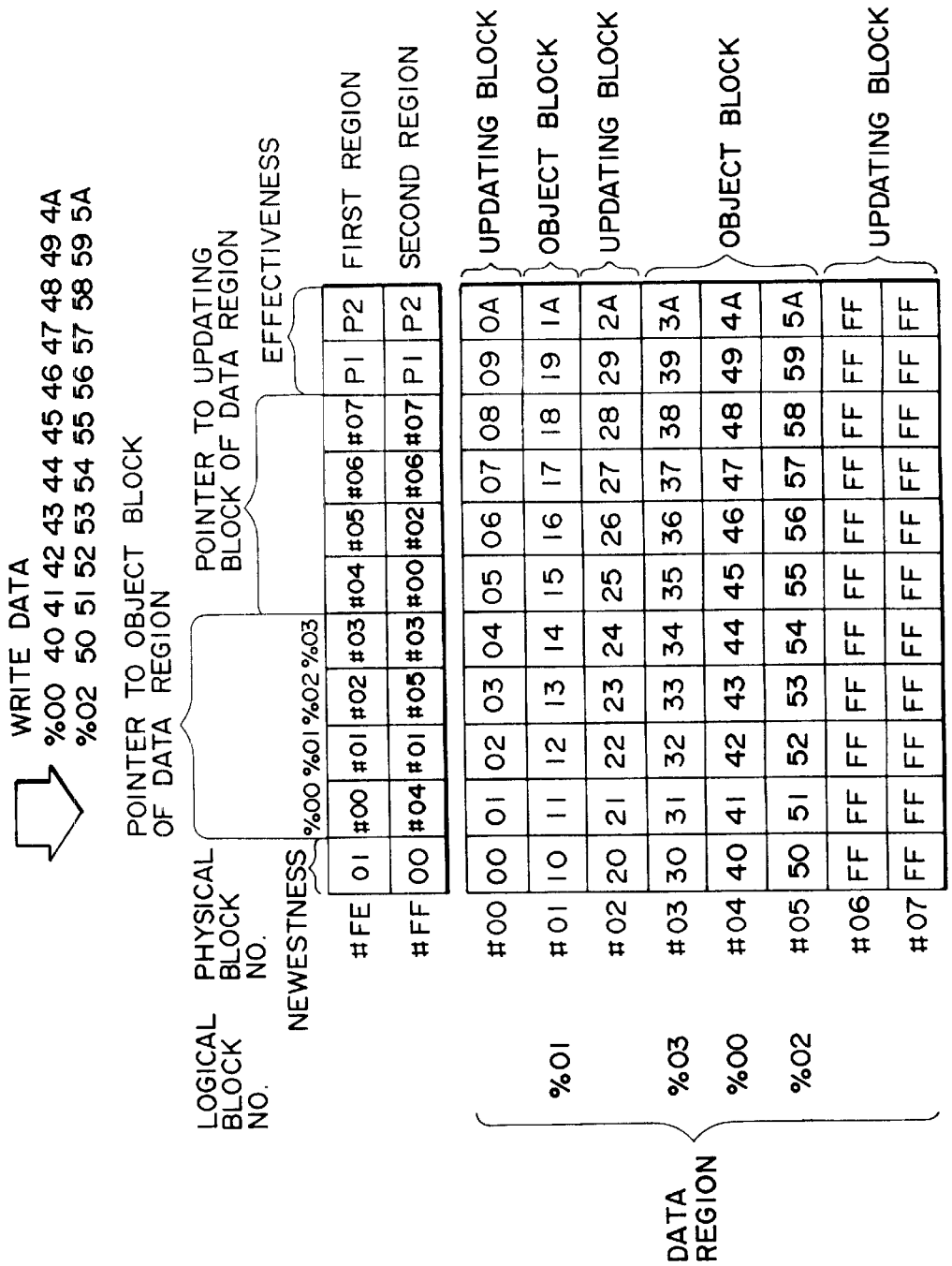
FIG. 8 is a diagram showing an example of a constitution of a memory to which the single pointer system is applied.

In this case, FIG. 8 shows a state where two data to be written to the physical block numbers #00H and #02H in correspondence with the logical block numbers %00H and %02H are assumed to be 40H through 4AH and 50H through 5AH, respectively, and these data are written to the physical blocks #04H and #05H which are the updating blocks, respectively.

Thereafter, the block numbers #04H and #05H of the physical blocks to which the new data have been written, are written to the column of pointers for the object blocks of the data region in the second region which have not been effective. That is, the column of pointers for the object blocks of the data region in the first region, is copied to the second region and as shown by FIG. 8, the physical block number #00H and #02H of the object blocks are respectively rewritten to the physical block number #04H and #05H of the updating blocks to which data has actually been written. As a result, when attention is paid to the second region, the physical block number #04H and #05H are respectively made to correspond to the logical block numbers %00H and %02H to which the physical block number #00H and #02H have been made to correspond.

Further, the physical blocks #00H and #02H which were to be written with data, are changed to updating blocks and the physical block numbers #00H and #02H are written to the column of pointers for the updating blocks of the data region in the second region which have not been effective. That is, the column of pointers for the updating blocks of the data region in the first region, is copied to the second region and as shown by FIG. 8, the physical block numbers #04H and #05H of the physical block to which data has been written among them, are respectively rewritten to the physical block numbers #00H and #02H of the object block. As a result, when attention is paid to the second region, the physical blocks #00H and #02H constitute updating blocks.

After updating the second region as described above, similar to the case of FIG. 4, the newest information and the effectiveness information in the second region are successively written (rewritten).

Accordingly, in this case, unless the column of pointers for the object blocks in the data region has been finished writing in respect of the second region, the effectiveness information signifying effectiveness is not written. That is, in the above-described case, unless data is finished writing to both of the two logical blocks %00H and %02H, the effectiveness information signifying effectiveness is not written to the second region.

Accordingly, when memory corruption is caused during a time period where data is being written to the two logical blocks %00H and %02H, only the first regions stays in an effective state. By referring to the effective first region, old data stored to the physical blocks #00H and #02H which are respectively made to correspond to the logical blocks %00H and %02H, are read from the logical blocks %00H and %02H.

In the meantime, when data has been finished writing to the two logical blocks %00H and %02H and the newest information and the effectiveness information in the second region have been updated, new data stored to the physical blocks #04H and #05H which are respectively made to correspond to the logical blocks %00H and %02H are read from the logical blocks %00H and %02H by referring to the second region which is effective and the newest.

In this case, when the two data as a plurality of data, which are stored to the logical blocks %00H and %02H, are related to each other, even in the case of causing memory corruption, not only the compatibility of individual data but also the compatibility between the two data can be maintained.

Figure 9:
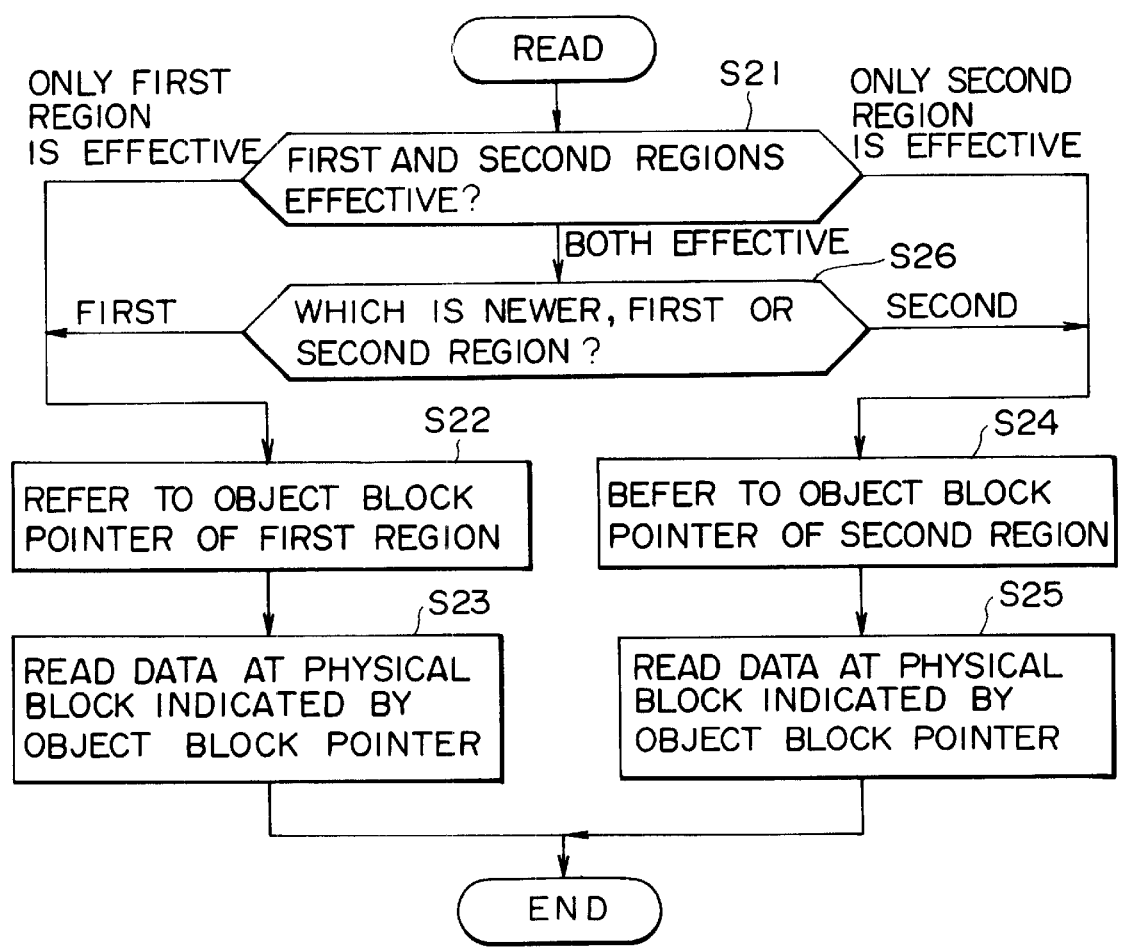
FIG. 9 is a flowchart for explaining reading processing by the single pointer system.
Figure 10:
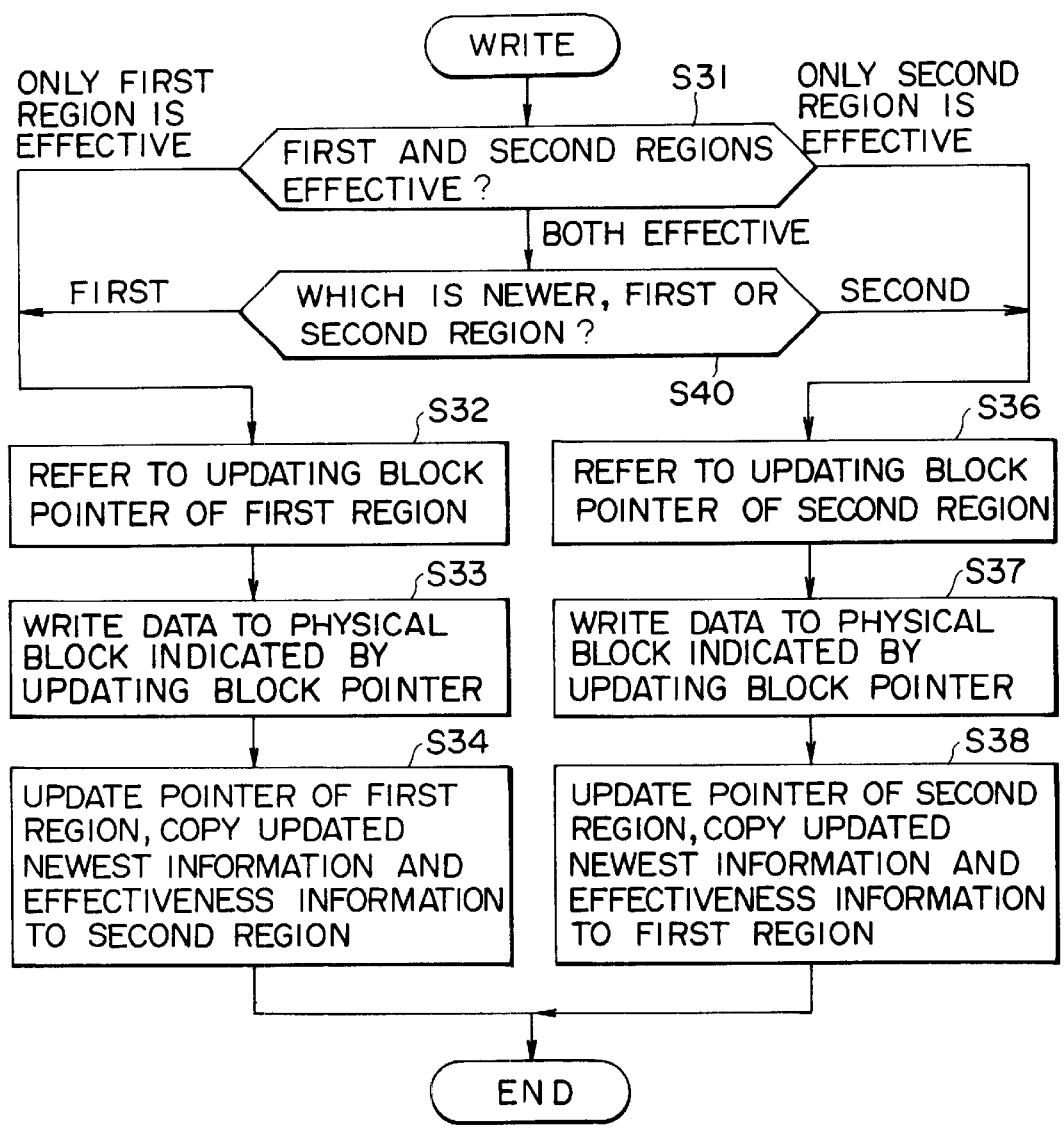
FIG. 10 is a flowchart for explaining writing processing by the single pointer system.

Next, a further explanation will be given of reading and writing processing of data in respect of the memory having the constitution shown by FIG. 7 and FIG. 8 in reference to flowcharts of FIG. 9 and FIG. 10.

First, an explanation will be given of reading processing in reference to a flowchart of FIG. 9.

In this case, firstly, in step S21 or S26, determination processing similar to that in the case of step S1 or S4 of FIG. 5 is carried out.

Further, when only the first region is effective and when although both of the first and second regions are effective, the first region is newer, the operation proceeds to step S22 and further, when only the second region is effective and when although both of the first and the second regions are effective, the second region is newer, the operation proceeds to step S24.

Instep S22, by referring to the column of pointers for the object blocks of the data region in the first region, the physical block number in correspondence with the logical block number (the logical number is supplied, for example, from outside) of data to be read, that is, the physical block number as a pointer to the object block is recognized and the operation proceeds to step S23. At step S23, data is read from the physical block in correspondence with the physical block number recognized at step S22 and the processing is finished.

Meanwhile, in step S24, by referring to the column of pointers for the object blocks of the data region in the second region, the physical block number in correspondence with the logical block number of data to be read, that is, the physical block number as a pointer for the object block is recognized and the operation proceeds to step S25. In step S25, data is read from the physical block in correspondence with the physical block number recognized at step S24 and the processing is finished.

Next, an explanation will be given of reading processing in reference to a flowchart of FIG. 10.

Also in this case, in step S31 or S40, determination processing similar to that in the case of step S1 or S4 of FIG. 5 is carried out.

Further, when only the first region is effective, and when although both of the first and the second regions are effective, the first region is newer, the operation proceeds to step S32. In step 32, the physical block number of the physical block capable of constituting the updating block is recognized by referring to the column of pointers for the updating blocks of the data region in the first region and the operation proceeds to step S33. In step S33, data to be written which is supplied from outside or the like, is written to the updating block.

Further, when data to be written to a plurality of the logical blocks is supplied from outside, in step S32, the physical block numbers of the updating blocks having numbers the same as the numbers of the plurality of logical blocks, can be recognized by successively searching, for example, from left to right direction the column of pointers for updating blocks of the data region in the first region. Further, in this case, in step S33, data from outside is successively written to the updating blocks respectively in correspondence with the recognized plurality of physical block numbers.

Thereafter, the operation proceeds to step S34, the column of pointers for the object blocks of the data region and the column of pointers for the updating blocks of the data region in the first region are updated and the newest information and the effectiveness information are updated, which is copied to the second region.

That is, in respect of the column of pointers for the object blocks of the data region, the physical block numbers which are made to correspond to the logical block numbers of the logical blocks to which data supplied from outside is to be written (#00H and #02H in the example of FIG. 7 and FIG. 8), are updated to the physical block numbers of the updating blocks to which data has actually been written (#04H and #05H in the example of FIG. 7 and FIG. 8). Further, in respect of pointers for the updating blocks of the data region, the physical block numbers (#04H and #05H in the example of FIG. 7 and FIG. 8) of the physical blocks to which data has been written (physical blocks which have been updating blocks), are updated to the physical block numbers which have been made to correspond to the physical block numbers of the physical block to which data has been to be written (#00H and #02H in the examples of FIG. 7 and FIG. 8). Further, the newest information and the effectiveness information are updated and the above-described result of updating is written to the second region and the processing is finished.

Meanwhile, when only the second region is effective, and when although both of the first and the second regions are effective, the second region is newer, the operation proceeds successively to steps S36 through S38 and operations respectively similar to those in steps S32 through S34 are carried out except that the processing in respect of the first or the second region is respectively carried out conversely in respect of the second or the first region.

Further, the reading and writing system in respect of the memory explained in reference to FIG. 7 through FIG. 10, uses the pointers of one stage in respect of the data region and accordingly, in the following, the system is pertinently referred to as single pointer system.

Meanwhile, in the case of the single pointer system, as shown by FIG. 7 and FIG. 8, four of the physical block numbers can be stored to the column of pointers for the object blocks of the data region and therefore, the compatibility of data of 4 blocks can be maintained at maximum.

In this case, in FIG. 7 and FIG. 8, 4 of the physical block numbers can be stored to the column of pointers for the updating blocks of the data region similar to the column for pointers in respect of the object blocks of the data region because 4 updating blocks are also needed in writing data of 4 blocks which is the maximum block number capable of maintaining the compatibility.

When the single pointer system is applied to the memory constitution of FIG. 7 and FIG. 8, as described above, the compatibility of data of 4 blocks can be maintained at maximum, and conversely, it is difficult to maintain the compatibility of blocks having a number larger than 4. That is, when only the physical block numbers of the physical blocks constituting the data region are stored to and controlled by the physical blocks of the first and the second regions, the block number capable of maintaining the compatibility of data is restricted by a number capable of storing the physical block numbers to the physical blocks of the first and the second regions.

Figure 11:
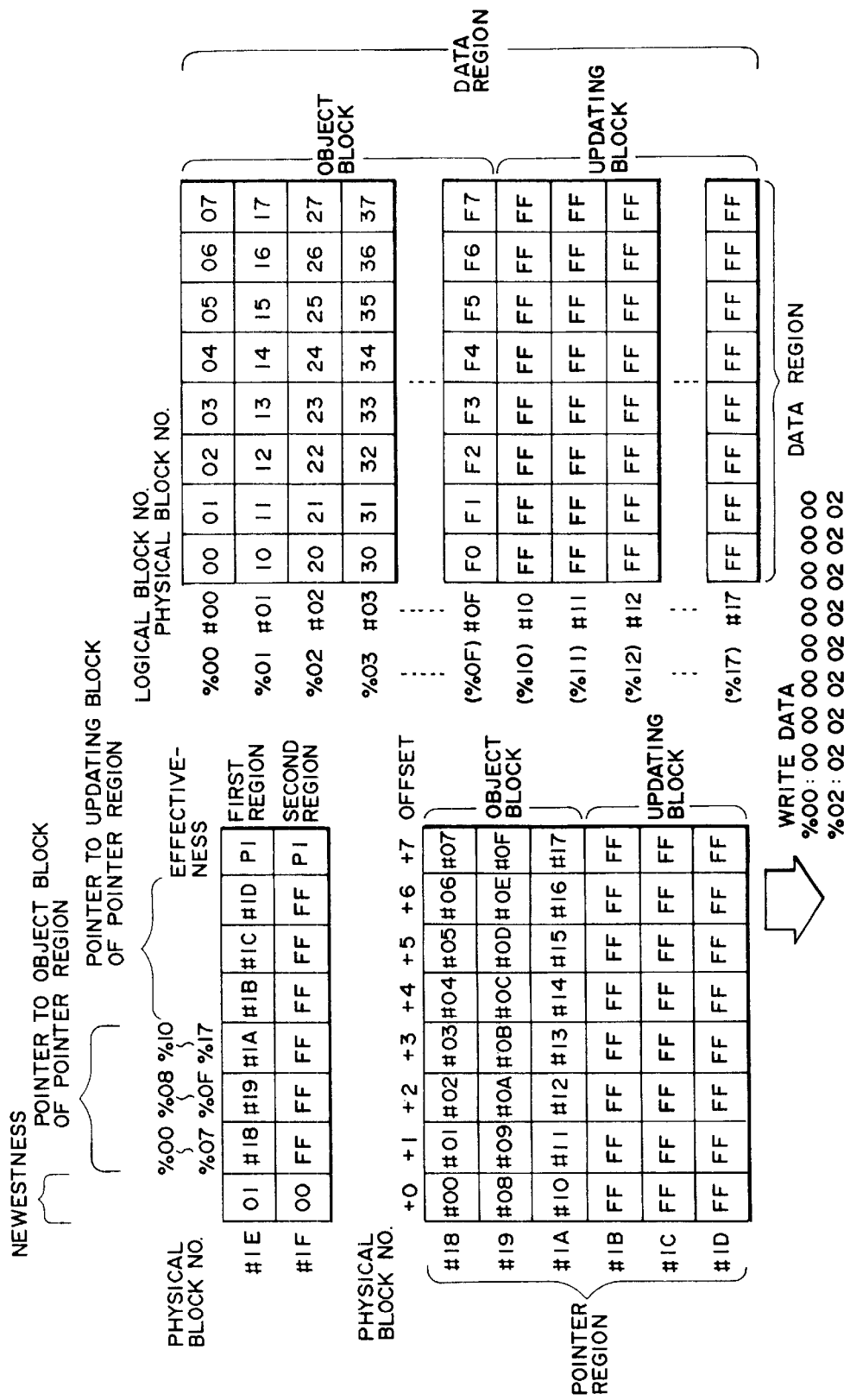
FIG. 11 is a diagram showing an example of a constitution of a memory to which the double pointer system is applied.

Hence, the memory is constituted, for example, as shown by FIG. 11.

That is, in this case, the memory is constituted by physical blocks of the data region for storing data, physical blocks as the pointer region for storing the block numbers as pointers for the physical blocks constituting the data region, and physical blocks as the first and the second regions for storing the block number of the physical blocks constituting the pointer region.

Incidentally, in FIG. 11, one physical block is constituted by 8 bytes in view of space.

The respective physical blocks constituting the data region store data by a unit of 8 bytes and in FIG. 11, the data region is constituted by 24 of the physical blocks respectively allocated with the physical block numbers of #00H through #17H.

Incidentally, in this case, 16 of the logical blocks are seen from outside and 16 of the logical blocks are respectively allocated with the logical block numbers of %00H through %0FH. However, in this case, for convenience of explanation, the logical blocks are assumed to exist by a number the same as a number of the physical blocks constituting the data region and 8 of the physical blocks other than the physical blocks which are seen from outside as the logical blocks, are respectively allocated imaginarily with the logical block numbers of %10 through %17. In the state shown by FIG. 11, the logical block numbers %00H through %17H are respectively made to correspond to the physical block numbers #00H through #17H.

The respective physical blocks composing the pointer region are constituted to store the physical block numbers for composing pointers for the physical blocks constituting the data region by a unit of 8 bytes and in FIG. 11, the pointer region is constituted by 6 of the physical blocks respectively allocated with the physical block numbers of #18 through #1D. In this case, the physical blocks constituting the pointer region store the physical block numbers by a unit of 8 bytes and further, the physical block number is represented by 1 byte and therefore, 8 of the physical block numbers are stored to one physical block.

Further, 8 of the physical block numbers arranged in each of the physical blocks of the pointer region are made to correspond to the logical block numbers. That is, the physical block numbers arranged at a 1st through an 8-th byte are made to correspond to the logical block numbers which are offset (shifted) by 0 through 7 from the reference of a certain logical block number (as mentioned later, %00H, %08H or %10H).

In respect of the blocks of the first and the second regions, a first 1 byte thereof is allocated to the newest information and a last 1 byte is allocated to the effectiveness information, respectively. Further, the physical block numbers of the physical blocks of the pointer region are arranged as pointers at 6 bytes between the newest information and the effectiveness information.

Among 6 bytes between the newest information and the effectiveness information in the first and the second regions, the physical block numbers of the object blocks of the pointer region are arranged at a former half of 3 bytes (hereinafter, pertinently referred to as column of pointers for object blocks of pointer region) and the physical block numbers of the updating blocks of the pointer region are arranged at a latter half of 3 bytes (hereinafter, pertinently referred to as column of pointers for updating blocks of pointer region).

The physical block numbers stored to the physical blocks of the pointer region in correspondence with 3 of the physical block numbers arranged at the column of pointers for the object blocks of the pointer region, are made to correspond to the logical block numbers.

That is, the physical block numbers stored to the physical blocks of the pointer region in correspondence with the physical block numbers arranged at a 1st through a 3rd byte, are respectively made to correspond to the logical block numbers %00H through %07H, %08H through %0FH and %10H through %17H.

For example, in FIG. 11, when attention is paid to the first region, the physical block numbers #00H through #07H arranged at a 1st through an 8-th byte of the physical blocks of the pointer region indicated by a 1st byte of a physical block number #18H in the column of pointers for the object blocks of the pointer region, are made to correspond respectively to the logical block numbers %00H through %07H which are made to correspond to the 1st byte in the column of pointers for the object blocks in the pointer region of the first region. That is, the physical block numbers arranged at the 1st through the 8-th byte of the physical blocks of the pointer region indicated by the 1st byte of the physical block number in the column of pointers for object blocks of the pointer region, are respectively made to correspond to the physical block numbers %00H through %07H which are offset by 0 through 7 from the reference of the physical block number %00H.

Further, the physical block numbers #08H through #0FH arranged at a 1st through an 8-th byte of the physical blocks in the pointer region indicated by a 2nd byte of a physical block number #19H in the column of pointers for object blocks of the pointer region, are respectively made to correspond to the logical block numbers %08H through %0FH which are made to correspond to the 2nd byte in the column of pointers for the object blocks of the pointer region in the first region. That is, the physical block numbers arranged at the 1st through the 8-th byte of the physical blocks of the pointer region indicated by the 2nd byte of the physical block number in the column of pointers for the object blocks of the pointer region, are made to correspond respectively to the logical block numbers %08H through %0FH which are offset by 0 through 7 from the reference of the logical block number %08H.

Similarly, the physical block numbers arranged at a 1st through an 8-th byte of the physical blocks in the pointer region indicated by a 3rd byte of a physical block number in the column of pointers for the object blocks of the pointer region, are respectively made to correspond to the logical block numbers %10H through %17H which are offset by 0 through 7 from the reference of the logical block number %00H.

Further, in FIG. 11, the physical block number of the first or the second region is respectively designated by a notation #1E or #1F.

According to the memory constituted as described above, for example, when attention is paid to the first region, the physical blocks in correspondence with the physical block numbers described in the column of pointers for the object blocks of the pointer region, constitute the object blocks of the pointer region. Accordingly, in FIG. 11, the physical blocks #18H through #1AH constitute the object blocks of the pointer region. Further, in FIG. 11, remaining physical blocks #1BH through #1DH in the pointer region constitute updating blocks for updating the pointer region. Thereby, the physical block numbers #1BH through #1DH are described as columns of pointers for the updating blocks of the pointer region in the first region.

Further, in FIG. 11, for example, the physical blocks in correspondence with the logical blocks %00H through %0FH among the physical blocks of the data region which correspond to the physical blocks described at the object blocks of the pointer region, constitute the object blocks of the data region. Accordingly, in FIG. 11, the remaining physical blocks of the data region (physical blocks in correspondence with logical blocks %10H through %17H) #10H through #17H, constitute the updating blocks for updating the data region.

The physical block numbers of the updating blocks of the pointer region are described in the column of pointers for the updating blocks of the pointer region and therefore, the updating blocks can be recognized by referring to the column. Meanwhile, the updating blocks of the data region are the physical blocks in correspondence with the logical blocks %10H through %17H and therefore, by referring to the physical blocks of the pointer region in correspondence with the physical block numbers described at a 3rd byte in the column of pointers for the object of blocks of the pointer region, the updating blocks can be recognized from the physical block numbers described there.

Now, only one region of the first or the second region, for example, only the first region is assumed to be effective and a request of writing two related data is made from outside to, for example, the logical blocks in correspondence with the logical block numbers %00H and %02H.

In this case, by referring to the column of pointers for the object blocks of the pointer region in the first region which is effective and by referring to the physical blocks in correspondence with the physical block numbers described there, the object blocks which are the physical blocks of the data region to which the two related data are to be written, are recognized. That is, by referring to a 1st byte of the column of pointers for the object blocks of the pointer region in the first region, the physical block #18H of the pointer region in which the physical block numbers of the physical blocks in the data region in correspondence with the logical blocks %00H and %02H, can be recognized. Further, by referring to a 1st byte and a 3rd byte of the physical block #18H, the physical block numbers #00H and #02H of the object blocks of the data region in correspondence with the logical blocks %00H and %02H, can respectively be recognized.

Thereafter, the updating blocks of the data region are recognized. By referring to the 3rd byte of the column of pointers for the object blocks of the pointer region in the first region, the physical block #1AH of the pointer region in which the physical block numbers of the physical blocks in correspondence with the logical blocks %10H through %17H which are to constitute the updating blocks of the data region, are described, can be recognized. Further, by referring to the physical block #1AH, the physical block numbers #10H through #17H of the physical blocks for constituting the updating blocks of the data region, can be recognized. The physical blocks having a number the same as a number of the object blocks of the data region which are objects of writing data as the updating blocks of the data region, are recognized by successively referring to the physical block #1AH, for example, from left. Accordingly, in this case, the physical blocks of the data region, which correspond to the physical block numbers #10H and #11H, constitute the updating blocks.

Figure 12:
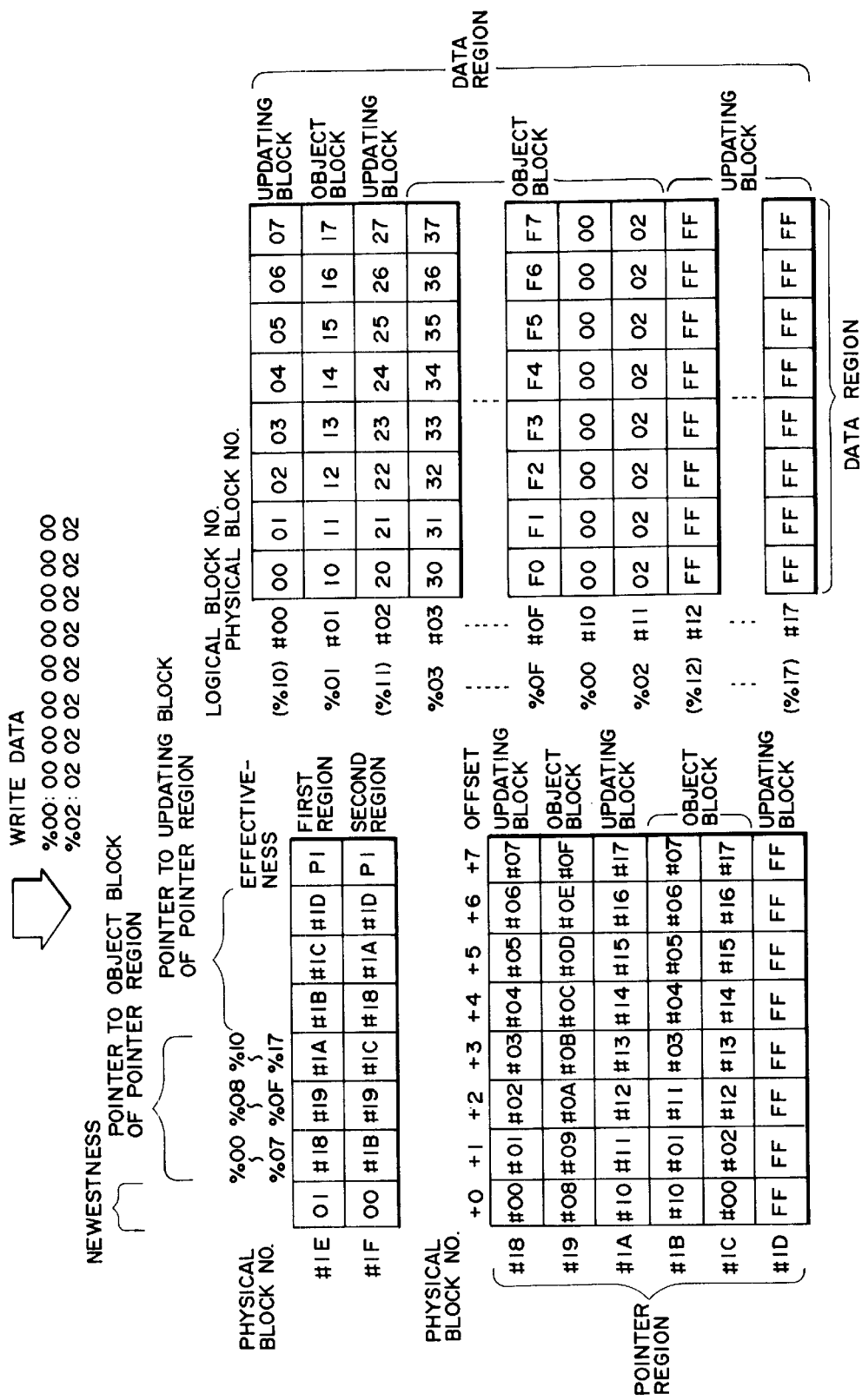
FIG. 12 is a diagram showing an example of the constitution of a memory to which the double pointer system is applied.

Further, as shown by FIG. 12, the two data which are to be written originally to the physical blocks #00H and #02H which are the object blocks of the data region, are respectively written to the physical block #10H and #11H that is the updating block of the data region.

In this case, FIG. 12 shows a state where the two data to be written to the physical block numbers #00H and #02H in correspondence with the logical block numbers %00H and %02H, are respectively designated by notations of 00H of 8 bytes and 02H of 8 bytes and these data are respective written to the physical blocks #10H and #11H which are the updating blocks of the data region.

As described above, after writing the two data which are to be written to the physical blocks in correspondence with the physical block numbers #00H and #02H of the data region which are stored to the physical blocks in correspondence with the physical block number #18H of the pointer region stored in the first region, respectively to the updating blocks #10H and #1H of the data region, the block numbers #10H and #11H of the physical blocks which have been the updating blocks of the data region, are written to the updating blocks of the pointer region and further, the physical block numbers #00H and #02H of the physical blocks of the data region which were to be written with data originally, are written to other updating blocks of the pointer region.

That is, firstly, the updating blocks of the pointer region are recognized by referring to the column of pointers for the updating blocks of the pointer region in the first region. In this case, the updating blocks of the pointer region comprise the physical blocks having a number the same as a number of the object blocks of the pointer region which need to change (update) in accordance with the above- described writing operation to the data region. The updating blocks of the pointer region are recognized by successively referring to the column of pointers for the updating blocks of the pointer region, for example, from left. Accordingly, in the above-described case, two of the updating blocks #1BH and #1CH of the pointer region having a number the same as a number of two physical blocks of the physical block #18H of the pointer region in which the physical block numbers #00H and #02H of the object blocks of data region which were to be originally written with data, are stored, and the physical block #1AH of the pointer region in which the physical block numbers #10H and #11H of the physical blocks which have actually been written with data, are recognized by successively referring the column of pointers for the updating blocks of the pointer region in the first region from left.

Further, for example, in the updating block #1BH of the recognized updating blocks #1BH or #1CH of the pointer region, store content of the physical block #18H of the pointer region in which the physical block numbers #00H and #02H of the object blocks of the data region are stored, is copied and the physical block number #00H or #02H of the object blocks of the data region in the store content, is respectively rewritten to the physical block number #10H or #11H of the updating block of the data region to which data has actually been written as shown by FIG. 12.

Further, in the remaining updating block #1CH of the recognized updating block #1BH or #1CH of the pointer region, store content of the physical block #1AH of the pointer region in which the physical block numbers #10H and #11H of the physical blocks to which the data has actually been written, are stored, is copied and as shown by FIG. 12, the physical block numbers #10H and #11H are respectively rewritten to the physical block numbers (object blocks of data region) #00H and #02H to which data were to be written originally.

Thereafter, the block numbers #1BH and #1CH of the physical blocks which have been the updating blocks of the pointer region where the physical block numbers have been updated, are written to the column of pointers for the object blocks of the pointer region in the second region which has not been effective. That is, the column of pointers for the object blocks of the pointer region in the first region is copied to the second region and a 1st byte of the first region in correspondence with the logical addresses %00H through %07H, are rewritten to the physical block number #1BH of the physical block of the pointer region and further, a 3rd byte thereof in correspondence with the logical addresses %10H through %17H are rewritten to the physical block number #1CH of the pointer region (FIG. 12).

As a result, when attention is paid to the second region, the physical blocks #1BH, #19H and #1CH become the object blocks of the pointer region by which the physical block #10H or #11H which has been the updating block of the data region, is respectively made to correspond to the logical block number %00H or %02H to which the physical block #00H or #02H which has been the object block of the data region, has been made to correspond and further, the physical block #00H or #02H which has been the object block, constitutes the updating block by respectively being made to correspond to the logical block %10H or %11H.

That is, when a 1st byte of the column of pointers for the object blocks of the pointer region in the second region, is referred, the physical block of the pointer region in which the physical block numbers of the physical blocks of the data region in correspondence with the logical blocks %00H and %02H are described, constitute the physical block #1BH and further, when a 1st byte and a 3rd byte of the physical block #1BH, are referred, the physical blocks of the data region in correspondence with the logical blocks %00H and %02H, respectively constitute the physical blocks #10H and #11H. Further, when a 3rd byte of the column of pointers for the object blocks of the pointer region in the second region, is referred, the physical blocks of the pointer region in which the physical block numbers of the physical blocks of the data region in correspondence with the logical blocks %10H and %11H, are described, constitute the physical block #1CH and when a 1st byte and a 2nd byte of the physical block #1CH, is referred, the physical blocks of the data region in correspondence with the logical blocks %10H and %11H, that is, the updating blocks of the data region, constitute the physical blocks #00H and #02H.

Further, the physical block number #18H of the physical block in the pointer region in which the physical block numbers #00H and #02H of the physical blocks to which data were to be written originally, has been stored, and the physical block number #1AH of the physical block in which the physical block numbers #10H and #11H to which data has actually been written, has been stored, are written to the column of pointers for the updating blocks of the pointer region in the second region. That is, the column of pointers for the updating blocks of the pointer region in the first region, is copied to the second region and as shown by FIG. 12, the physical block number #1BH or #1CH of the physical block of the pointer region in which the store content has been updated, is respectively rewritten to the physical block number #18H in which the physical block numbers in correspondence with the logical addresses %00H through %07H have been stored, or the physical block number #1AH in which the physical block numbers in correspondence with the logical addresses %10H through %17H have been stored.

As a result, when attention is paid to the second region, the physical blocks #18H, #1AH and #1DH constitute the updating blocks of the pointer region.

After updating the second region as described above, similar to the case of the single pointer system, the newest information and the effectiveness information in the second region are successively written.

Accordingly, in this case, unless the writing operation in respect of the data region and the pointer region has been finished, the effectiveness information signifying effectiveness cannot be written. That is, in the above-described case, unless the writing operation of data to the two logical blocks %00H and %02H has been finished, the effectiveness information signifying effectiveness cannot be written to the second region.

As a result, when memory corruption is caused during a time period where data is being written to the two logical blocks %00H and %02H, only the first region stays in an effective state and by referring to the first region which is effective, old data stored to the physical blocks #00H and #02H which are respectively made to correspond to the logical blocks %00H and %02H, are read from the logical blocks %00H and %02H.

In the meantime, when the writing operation of data to the two logical blocks %00H and %02H has been finished and the newest information and the effectiveness information in the second region has been updated, by referring to the second region which is effective and the newest, new data stored to the physical blocks #10H and #11H which are respectively made to correspond to the logical blocks %00H and %02H, are read from the logical blocks %00H and %02H.

Accordingly, when the two data as the plurality of data stored to the logical blocks %00H and %02H are related to each other, even in the case where memory corruption is caused, similar to the case of the single pointer system, the compatibility between the two data can be maintained.

Further, the physical block numbers of three of the physical blocks in the pointer region can be stored to the column of pointers for the object blocks of the pointer region in the first and the second regions and the physical block numbers of 8 of the physical blocks of the data region can be stored to a single one of the physical blocks in the pointer region and therefore, 24(=3×8) of the physical blocks of the data region can be controlled at maximum. Accordingly, 12 blocks which are a half of the 24 blocks can constitute the updating blocks of the data region at maximum and the compatibility of data of a number of the blocks, that is, a number of blocks larger than that of the single pointer system by the number of blocks can be maintained. Further, in FIG. 11, and FIG. 12, 8 blocks in the 24 blocks constitute the updating blocks and the compatibility of data of 8 blocks can be maintained at maximum.

In this case, the reading and writing system in respect of the memory explained in reference to FIG. 11 and FIG. 12 as described above, utilizes, so to speak, two stages of pointers with respect to the data region and is pertinently referred to as double pointer system in the following.

Figure 13:
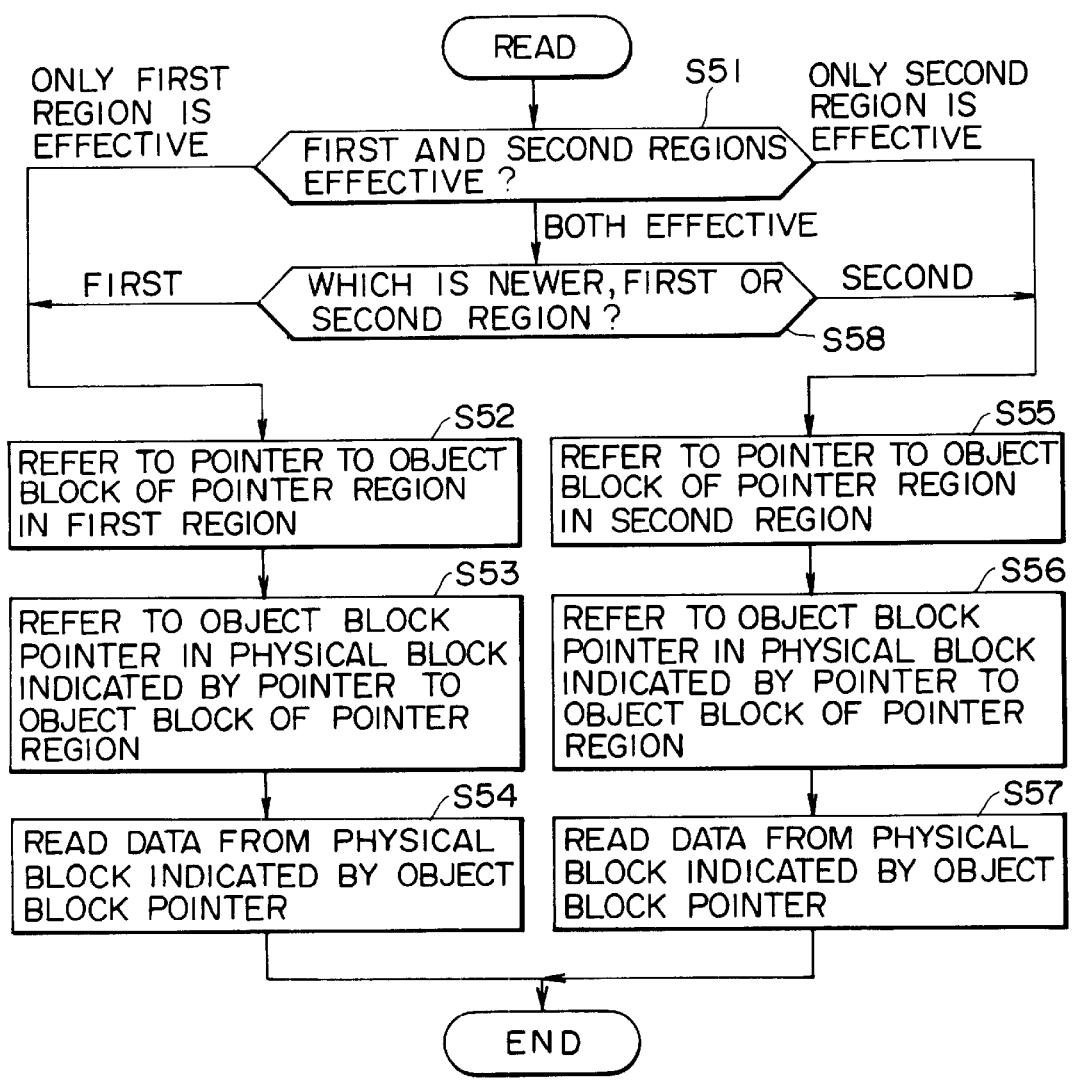
FIG. 13 is a flowchart for explaining reading processing by the double pointer system.
Figure 14:
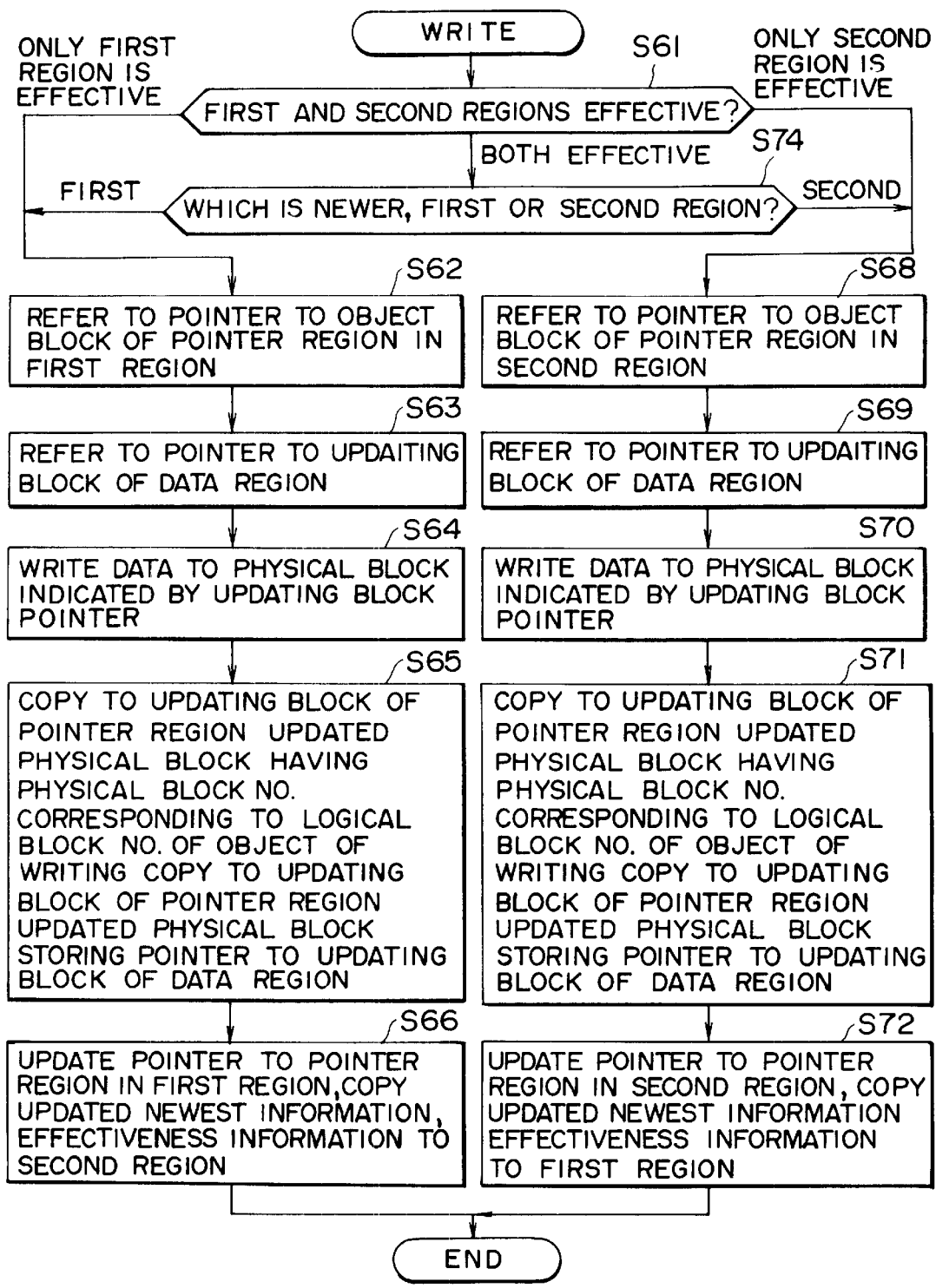
FIG. 14 is a flowchart for explaining writing processing by the double pointer system.

Next, a further explanation will be given of reading and writing processing of data according to the double pointer system in reference to flowcharts of FIG. 13 and FIG. 14.

First, an explanation will be given of reading processing in reference to a flowchart of FIG. 13.

In this case, firstly, in step S51 or S58, determination processing respectively similar to that in the case of step S1 or S4 of FIG. 5 is carried out.

Further, when only the first region is effective and when although both of the first and the second regions are effective, the first region is newer, the operation proceeds to step S52 and when only the second region is effective and when although both of the first and the second regions are effective, the second region is newer, the operation proceeds to step S55.

In step S52, by referring to the column of pointers for the object blocks of the pointer region in the first region, the physical block number (pointer) of the physical block of the pointer region where the physical block number in correspondence with the logical block number of data to be read, is recognized and the operation proceeds to step S53. That is, for example, when the memory is constituted as explained in reference to FIG. 11, in the case where the logical block number falls in a range of %00H through %07H or %08H through %0FH, the physical block number stored to the first or the second byte of the column of pointers for the object blocks of the pointer region is respectively recognized.

In step S53, by referring to the physical block of the pointer region in correspondence with the physical block number recognized in step S52, the physical block number in correspondence with the logical block number of data to be read is recognized and the operation proceeds to step S54. That is, when the logical block number of data to be read is a value offset by 0 through 7 from a certain reference value (%00H or %08H in the case of FIG. 11) the physical block number stored to a position shifted by the offset from left of the physical block in correspondence with the physical block number recognized at step S52, is recognized as the physical block number in correspondence with the logical block number of data to be read.

Further in step S54, data is read from the physical block in correspondence with the physical block number recognized in step S53 and the processing is finished.

In the meantime, at step S55, by referring to the column of pointers for the object blocks of the pointer region in the second region, the physical block number of the physical block of the pointer region in which the physical block number in correspondence with the logical block number of data to be read is stored, is recognized and thereafter, the operation successively proceeds to steps S56 and S57 where processes respectively in correspondence with steps S53 and S54 are carried out and the processing is finished.

Next, an explanation will be given of writing processing in reference to a flowchart of FIG. 14.

Also in this case, in step S61 or S74, determination processing respectively similar to that in the case of step S1 or S4 of FIG. 5 is carried out.

Further, when only the first region is effective and when although the both of the first and the second regions are effective, the first region is newer, the operation proceeds to step S62, by referring to the column of pointers for the object blocks of the pointer region in the first region, the physical block number of the physical block of the pointer region in which the physical block number of the physical block of the data region capable of constituting the updating block is stored, is recognized and the operation proceeds to step S63. That is, for example, when the memory is constituted as shown by FIG. 11, the physical block number #1AH stored to the 3rd byte of the column of pointers for the object blocks of the pointer region in the first region is recognized.

In step 563, by referring to the physical block number of the updating block of the data region which is stored to the physical block in correspondence with the physical block number recognized in step S62, the updating block of the data region is recognized and the operation proceeds to step S64 and data to be written which is supplied from outside or the like is written to the updating block of the data region.

Further, when data to be written to a plurality of logical blocks are supplied from outside, at step S63, the physical block numbers of the updating blocks of the data region having a number the same as a number of the plurality of logical blocks, are recognized by successively searching the physical blocks (physical blocks in pointer region) in correspondence with the physical block numbers recognized in step S62, for example, from left to right direction. Further, in this case, at step S64, data from outside are successively written to the updating blocks of the data region respectively in correspondence with the plurality of physical block numbers recognized in this way.

Thereafter, the operation proceeds to step S65, the physical blocks in which the physical block numbers which have been made to correspond to the logical block numbers of the logical blocks of objects of writing data, have been stored and which have been updated are copied to the updating blocks of the pointer region. That is, for example, in the case where an explanation has been given in reference to FIG. 11 and FIG. 12, the physical block #18H storing the physical block numbers #00H and #02H which are made to correspond to the logical block numbers %00H and %02H of the logical blocks constituting objects of writing data, is updated and the physical block numbers #00H and #02H are respectively changed to #10H and #11H, which is copied to the updating block #1BH of the pointer region.

Further, in step S65, the physical blocks storing the pointers (physical block numbers of updating blocks of data region) in respect of the updating blocks of the data region, which have been updated, are copied to the updating blocks of the pointer region. That is, for example, in the case where an explanation has been given in reference to FIG. 11 and FIG. 12, the physical block #1AH storing the physical block numbers #10H through #17H of the updating blocks of the data region, is updated and the physical block numbers #10H and #11H are respectively changed to #00H and #02H, which is copied to the updating block #1C of the pointer region.

Further, the operation proceeds to step S66, the column of pointers for the object blocks of the pointer region and the column of pointers for the updating blocks of the pointer regions in the first region, are updated and the newest information and the effectiveness information are updated, which is copied to the second region.

That is, for example, according to an example of the case of FIG. 11 and FIG. 12, in respect of the column of pointers for the object blocks of the pointer region in the first region, the physical block number #18H stored to the 1st byte constituting pointers for the physical blocks #00H and #02H of the data region which are made to correspond to the logical block for writing data supplied from outside, is updated to the physical block number #1BH constituting pointers for the physical blocks #10H and #11H of the data region to which the data has actually been written, and the physical block number #1AH constituting pointers for the physical blocks #10H and #11H of the data region to which data has actually been written, is updated to the physical block number #1CH constituting pointers for the physical blocks #00H and #02H of the data region which are made to correspond to the logical blocks to which data has been written.

Further, with respect to the column of pointers for the updating blocks of the pointer region in the first region, the physical block numbers #1BH and #1CH of the physical blocks (physical blocks which have been updating blocks) of the pointer region in which the physical block numbers have been updated, are updated respectively to the physical block numbers #18H and #1AH of the physical blocks which have become the updating blocks of the pointer region.

Further, the newest information and the effectiveness information in the first region is updated, the above-described result of updating is written to the second region and the processing is finished.

Meanwhile, when only the second region is effective and when although both of the first and the second regions are effective, the second region is newer, the operation proceeds to successively steps S68 through S72 where processes respectively similar to those in the case of steps S62 through S66 are carried out except that processing in respect of the first or the second region is conversely carried out in respect of the second or the first region, respectively.

Further, also in the case of the double pointer system, similar to the single pointer system, the number of the physical blocks capable of maintaining the compatibility is restricted, however, when the double pointer system is expanded similar to the case of expanding the single pointer system to the double pointer system and pointers with respect to the data number of the physical blocks capable of maintaining the compatibility can be increased further. Accordingly, by considering the length of one block and pertinently setting the number of stages of pointers for the data region, the upper limit of the number of physical blocks capable of maintaining the compatibility can be made to a desired value.

Figure 15:
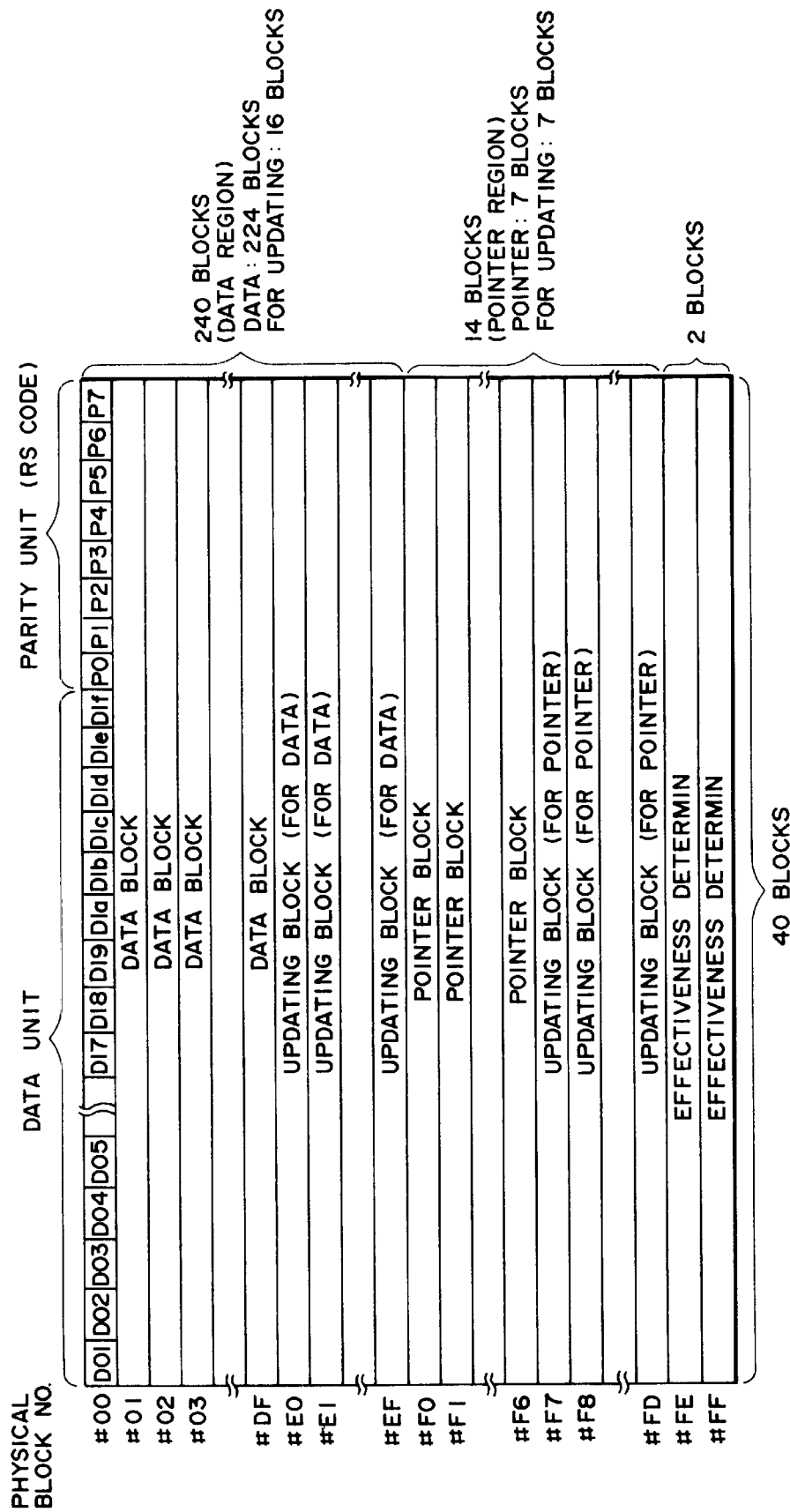
FIG. 15 is a diagram showing an example of a constitution of EEPROM 66 of FIG. 3 when data is read and written by the double pointer system.

Next, reading and writing processing of data in respect of EEPROM 66 by the sequencer 91 of the IC card 2 shown by FIG. 3, is carried out in accordance with the above-described double pointer system and an example of allocating memory of EEPROM 66 in this case is shown in FIG. 15.

In FIG. 15, EEPROM 66 is provided with 256 of physical blocks. Each physical block is constituted by the total of 40 bytes of 32 bytes of data unit (D00 through D1F) and 8 bytes of a parity unit (P0 through P5).

Further, in FIG. 15, the physical block numbers #00H through #FFH are allocated respectively to the 256 physical blocks in which the physical blocks #00H through #EFH constitutes a data region, the physical blocks #F0H through #FDH constitutes a pointer region and the physical blocks #FEH and #FFH constitute the first and the second regions, respectively.

Further, in respect of the data region, among the 240 physical blocks #00H through #EFH, the 224 physical blocks constitute object blocks (hereinafter, also referred to as data blocks) and the remaining 16 physical blocks constitute updating blocks. Accordingly, the compatibility of data of 16 blocks can be maintained at maximum. Further, in the state shown by FIG. 15, the physical blocks #00H through #DFH constitute the data block and the physical blocks #E0H through #EFH constitute updating blocks.

In respect of the pointer region, 7 of the 14 physical blocks #F0H through #FDH object blocks (hereinafter, also referred to pointer blocks) and 7 of the 14 physical blocks constitute updating blocks, respectively. Further, in the state shown by FIG. 15, the physical blocks #F01 through #F6H constitute pointer blocks and the physical blocks #F7H through #FDH constitute updating blocks.

Further, in FIG. 15, the first and the second regions are illustrated as effectiveness determining blocks.

Figure 16:
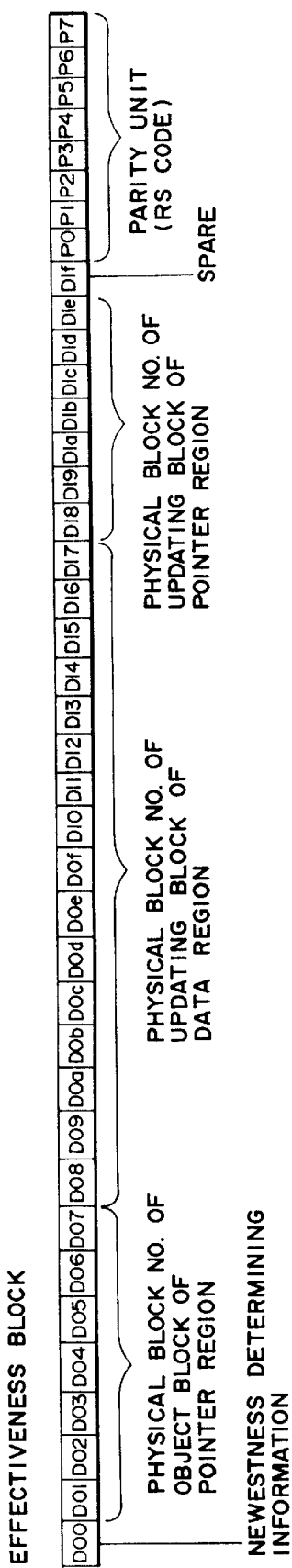
FIGS. 16A and 16B are diagrams showing an example of a constitution of physical blocks for constituting an effectiveness determining block.

FIGS. 16A and 16B show an example of the constitution of the effectiveness determining blocks (first and second regions).

As shown by FIG. 16A, the newest information (newest determination information) is arranged at a 1st byte (D00) of the data unit of the effectiveness block and physical block numbers of object blocks (pointer blocks) of a pointer region are arranged at a 2nd through an 8-th byte (D01 through D07).

Physical block numbers of updating blocks in the data region are arranged at a 9-th through a 24-th byte (D08 through D17) of the data unit of the effectiveness determining block. That is, in the above-described case, in the first and the second regions, the physical block numbers (pointers for pointers for updating blocks of data region) of the physical blocks of the pointer region in which the physical block numbers of updating blocks of the data region are stored, however, in this case, the physical block numbers (pointers for updating blocks of data region) of the updating blocks of the data region are directly arranged in the effectiveness determining block.

Accordingly, in this case, there is no physical block in which the physical block number of the updating block of the data region is stored in the pointer region.

Physical block numbers of updating blocks of the pointer region are arranged to a 25-th through a 31st byte (D18 through D1E) of the data unit of the effectiveness determining block and a 32nd byte thereof (D1F) is set aside as reserve.

Further, the parity unit of the effectiveness determining block is arranged with, for example, RS code or the like in correspondence with the above-described effectiveness determining information.

Here, FIG. 16B shows an example of initial values of the data unit in the effectiveness determining block in the case where EEPROM 66 is constituted.

Figure 17:
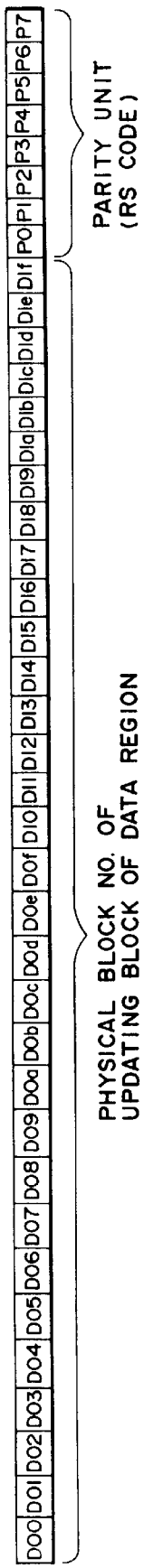
FIGS. 17A and 17B are diagrams showing an example of a constitution of physical blocks for constituting a pointer region.

Next, FIGS. 17A and 17B show examples of the constitution of physical blocks (pointer blocks and updating blocks thereof) constituting a pointer region.

As shown by FIG. 17A, the physical block numbers of the physical blocks of the data region are arranged by a unit of 32. Further, the parity unit of the physical block constituting the pointer region is not used as the above-described effectiveness information but serves as a normal parity and accordingly, it is preferable that information arranged to the parity unit is provided with error correcting capability. This is because in the double pointer system, the effectiveness of whether information arranged to the data unit of the physical blocks constituting the pointer region is erred, is finally determined not by the information arranged to the parity unit but based on the parity unit as effectiveness information of effectiveness determining block.

Here, FIG. 17B shows an example of initial values of the data unit of the physical blocks constituting the pointer region in the case where EEPROM 66 is constituted as shown by FIG. 15.

Further, the physical blocks (data blocks and updating blocks thereof) constituting the data region are constituted similar to the physical blocks constituting the pointer region except that not the physical block numbers but data for reading and writing is arranged in the data unit and therefore, an explanation thereof will be omitted.

Next, an explanation will be given of reading and writing processing in respect of EEPROM 66, when EEPROM 66 is constituted as described above.

Figure 18:
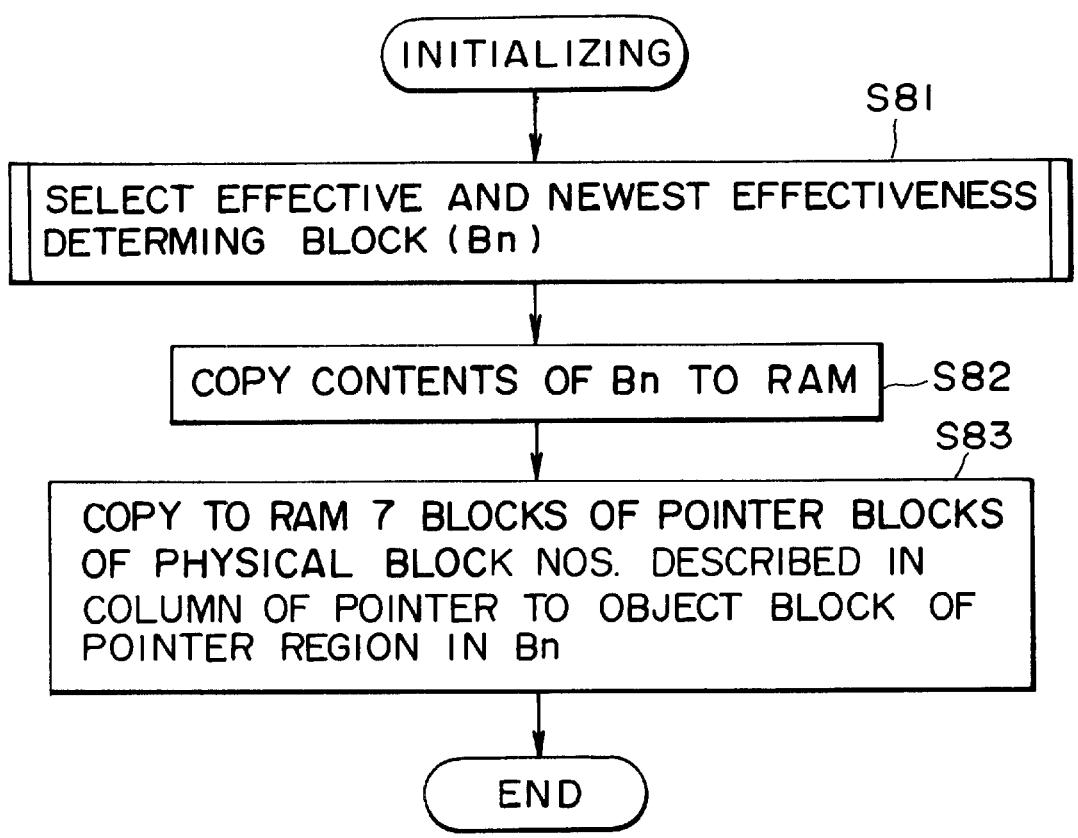
FIG. 18 is a flowchart for explaining initializing processing which is carried out prior to carrying out reading and writing processing in respect of EEPROM 66.

When the IC card 2 approaches R/W 1 and supply of power source is started at the respective blocks constituting the IC card 2 as described above, initializing processing in accordance with a flowchart of FIG. 18 is carried out at the sequencer 91.

That is, in this case, firstly, in step S81, the sequencer 91 selects an effective and newest effectiveness determining block by referring to EEPROM 66, the operation proceeds to step S82 and the selected effectiveness determining block is copied to the RAM 67. Further, the operation proceeds to step S83, the sequencer 91 refers to physical block numbers of pointer blocks at the pointer region arranged at the selected effectiveness determining block, reads the pointer blocks in correspondence with the physical block numbers from EEPROM 66, copies them to RAM 67 and the initializing processing is finished.

By the above-described initializing processing, at RAM 67, as shown by FIG. 19, effective and newest effectiveness determining blocks and physical block numbers (as shown by FIG. 15, physical block numbers #00H through #DFH when EEPROM 66 is constituted) of data blocks of the data region stored to 7 pointer blocks, are stored.

Next, a flowchart of FIG. 20 shows details of processing at step S81 of FIG. 18.

In this case, firstly, at step S91, the sequencer 91 refers to the parity unit as the effectiveness information of the effectiveness determining block in correspondence with the physical block numbers #FEH and #FFH.

When it is determined in step S91 that only the effectiveness determining block in correspondence with the physical block number #FEH is effective, the operation proceeds to step S92, the sequencer 91 sets the physical block number #FEH to a variable Bn for storing the physical block number of the effectiveness determining block to be selected and the operation returns. Further, when it is determined in step S91 that only the effectiveness determining block in correspondence with the physical block number #FFH is effective, the operation proceeds to step S93, the sequencer 91 sets the physical block number #FFH to the variable Bn and the operation returns.

In the meantime, when it is determined in step S91 that both of the effectiveness determining blocks in correspondence with the physical block numbers #FEH and #FFH are effective, the operation proceeds to step S94, the sequencer 91 determines which of the effectiveness determining blocks is new by referring to a 1st byte of the data unit as the newest information of each of the effectiveness determining blocks. When it is determined in step S94 that the effectiveness determining block in correspondence with the physical block number #FEH or #FFH is newer, the operation proceeds to step S92 or S93 and a processing similar to that in the respective above-described cases is performed and the operation returns.

Next, an explanation will be given of reading processing of the sequencer 91 when a request of reading data from EEPROM 66 is made to the sequencer 91 after finishing the above initializing. Further, in this case, also the logical block number of the logical block storing the read data is supplied to the sequencer 91 along with the request of reading data.

Figure 21:
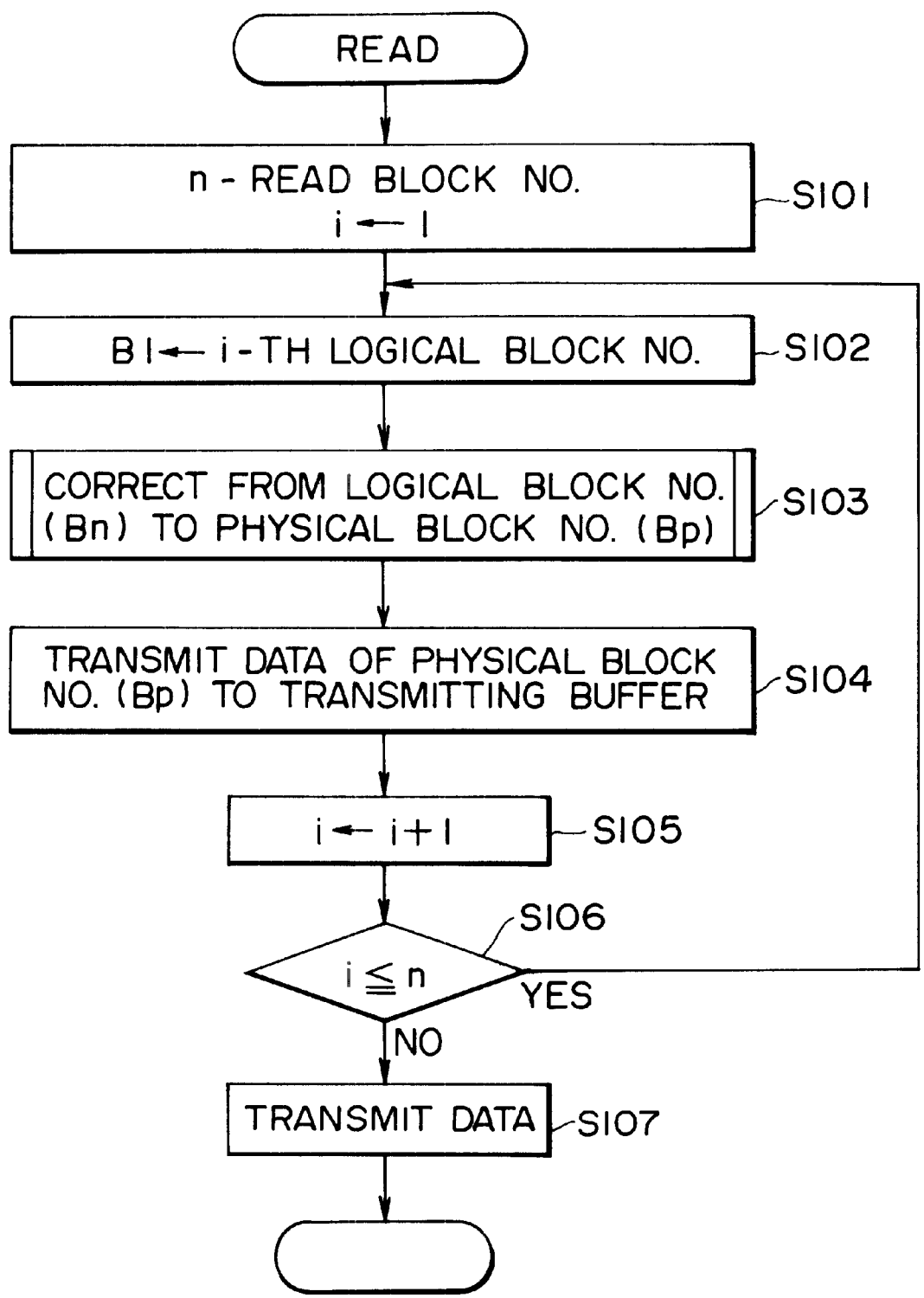
FIG. 21 is a flowchart for explaining reading processing in respect of EEPROM 66.

In this case, as shown by a flowchart of FIG. 21, firstly, at step S101, the sequencer 91 sets the block number of data to be read to a variable "n" and sets, for example, 1 to a variable "i" for counting the block number as an initial value. Here, the sequencer 91 is supplied with the logical block number of the logical block to which data to be read is stored as described above and the sequencer 91 recognizes the block number "n" as the data to be read according to the number of the logical block number.

Thereafter, at step S102, the sequencer 91 sets the logical block number of an i-th logical block to the variable B1, the operation proceeds to step S103 and as described above, a physical block number Bp that is made to correspond to the logical block number B1 is recognized by referring to RAM 67.

Further, the sequencer 91 reads data from the physical block in correspondence with the physical block number Bp of EEPROM 66 and transfers the data to a transmitting buffer provided to RAM 67 in step S104. That is, a region for constituting the transmitting buffer is provided to RAM 67 other than the region for storing the result of initializing processing explained in reference to FIG. 18 and data read from EEPROM 66 is transmitted to the transmitting buffer.

Thereafter, at step S105, the sequencer 91 increments the variable "i" by 1, the operation proceeds to step S106 and it is determined whether the variable "i" is "n" or lower. When it is determined in step S106 that the variable "i" is equal to or lower than "n", that is, when data of the requested block number has not been read, the operation returns to step S102 and similar processes as described above are carried out in following steps. Further, when it is determined in step S106 that the variable "i" is larger than "n", that is, when the reading operation of data of the requested logical block has been finished, the operation proceeds to step S107, data stored to the transmitting buffer of RAM 67 is transmitted to R/W 1 as described above and the reading processing is finished.

Figure 22:
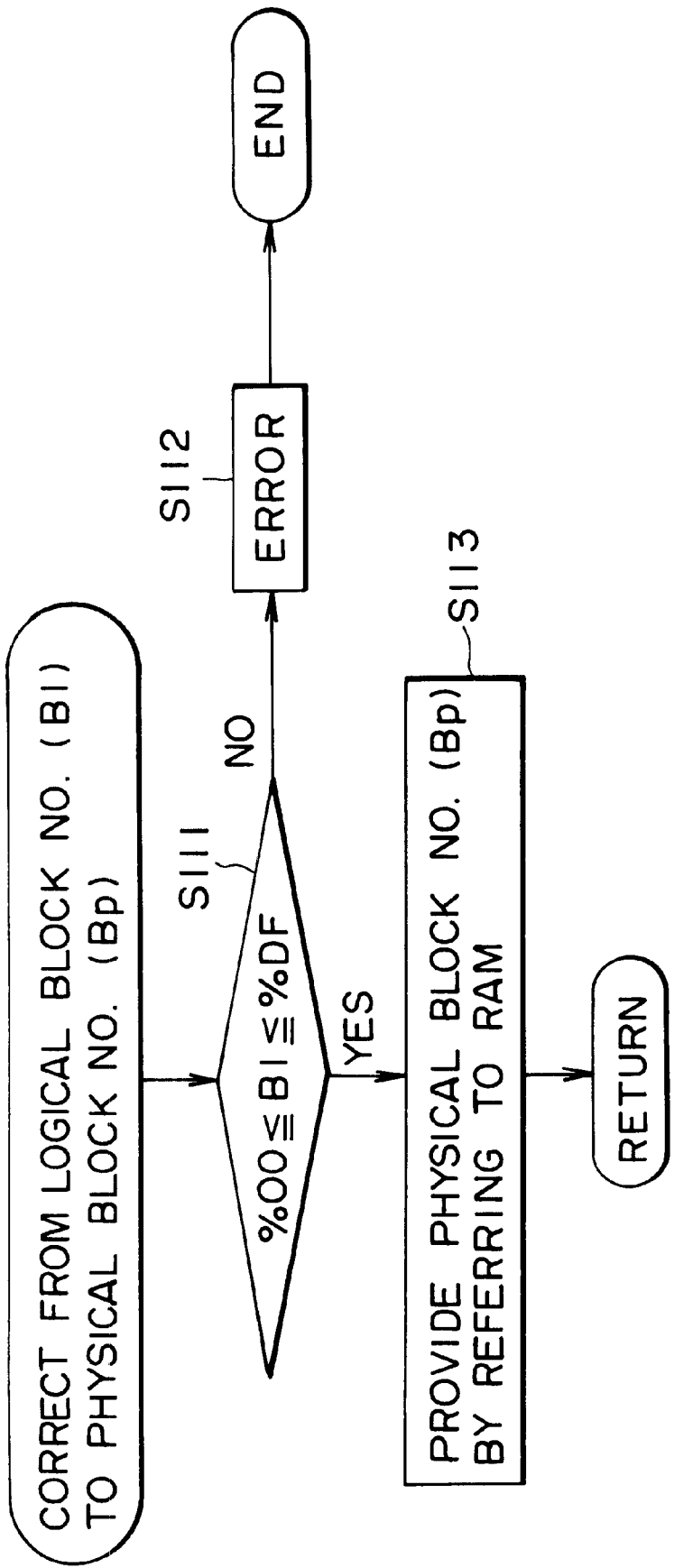
FIG. 22 is a flowchart for explaining further details of a processing at step S103 of FIG. 21.

Next, a flowchart of FIG. 22 shows further details of the processing at step S103 of FIG. 21.

In this case, firstly at step S111, the sequencer 91 determines whether the logical block number B1 is a value in a range of %00H or higher and %DFH or lower.

Here, EEPROM 66 prepares 224 (equal to number of data blocks) of logical block numbers within a range of %00H or higher and %DFH or lower and the determination processing at step S111 is carried out to confirm whether the logical block number B1 is a usable value.

When it is determined in step S111 that the logical block number B1 is not a value within the range of %001 or higher and %DFH or lower, the operation proceeds to step S112, predetermined error processing is carried out and the reading processing is finished. That is, in this case, the logical block number B1 is not a usable value and therefore, processing thereafter is not carried out.

In the meantime, when it is determined in step S111 that the logical block number B1 is a value within a range of %00H or higher and %DFH or lower, the operation proceeds to step S113, the physical block number Bp in correspondence with the logical block number B1 is recognized by referring to RAM 67 and the operation returns.

Next, an explanation will be given of writing processing of the sequencer 91 when a request of writing data to EEPROM 66 (updating of data stored to EEPROM 66) is made to the sequencer 91 after performing initializing processing explained in reference to FIG. 18.

Further, in this case, along with the request of writing data, the data and the logical block number of the logical block to which the data is written, are supplied to the sequencer 91. Furthermore, the region of the receiving buffer for storing written data which is received by the sequencer 91, is secured in RAM 67 in addition to the above-described region and data to be written is stored to the receiving buffer.

Figure 23:
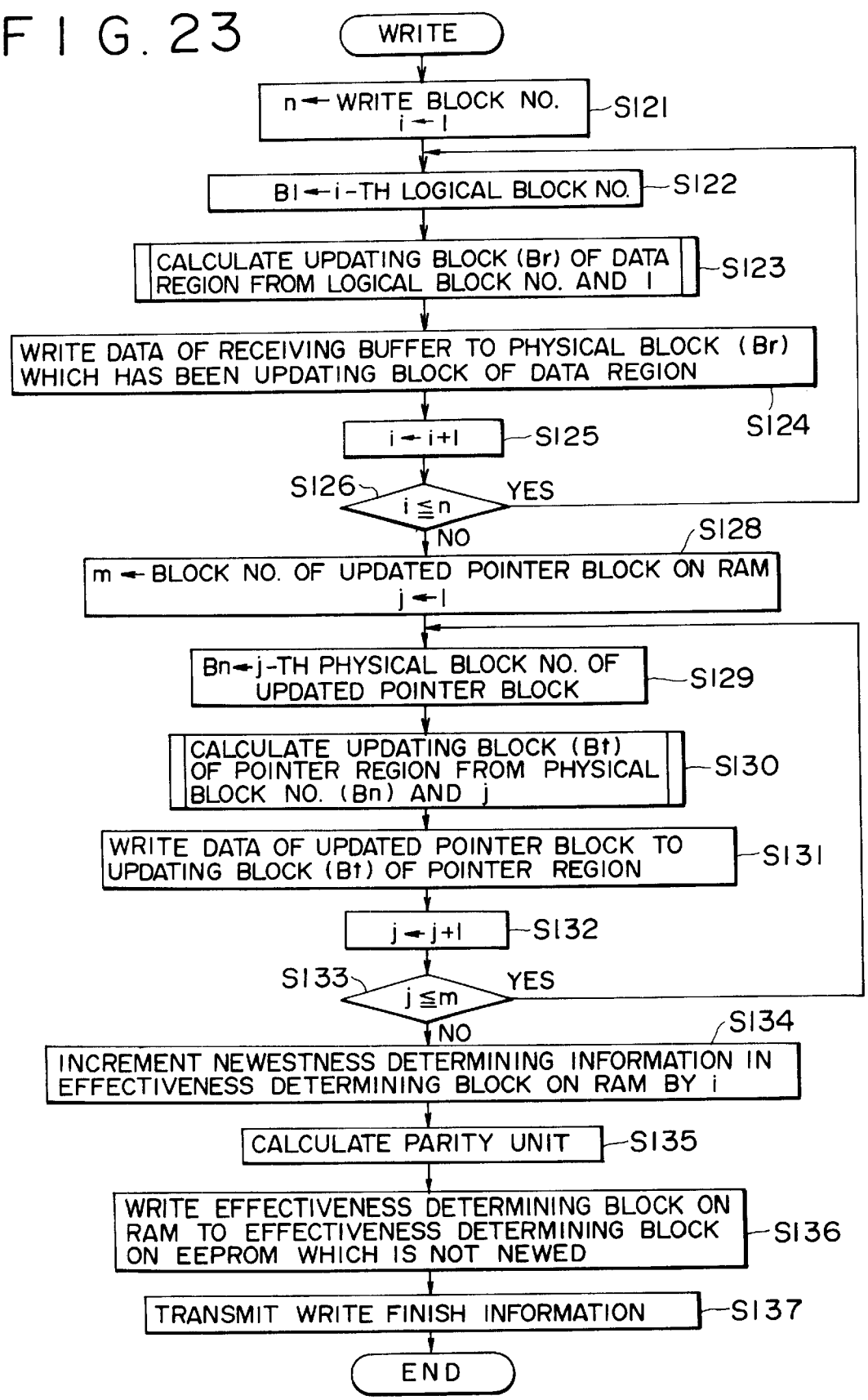
FIG. 23 is a flowchart for explaining writing processing in respect of EEPROM 66.

In this case, as shown by a flowchart of FIG. 23, firstly, at step S121, the sequencer 91 sets the block number of data to be written to the variable "n" and sets, for example, 1 to the variable "i" for counting the block number as an initial value. In this case, as described above, in respect of the sequencer 91, the block number "n" of data to be written is recognized from a number of the logical block numbers supplied thereto.

Thereafter, at step S122, the sequencer 91 sets the logical block number of an i-th logical block (logical block to be written with an i-th data) to the variable B1, the operation proceeds to step S123 and RAM 67 is referred by which as described above, the physical block number Br of the updating block of the data region to which data to be written to the logical block in correspondence with the logical block number B1 is actually written, is calculated and further, along therewith, a processing of making the updating block Br a data block is carried out.

Figure 24:
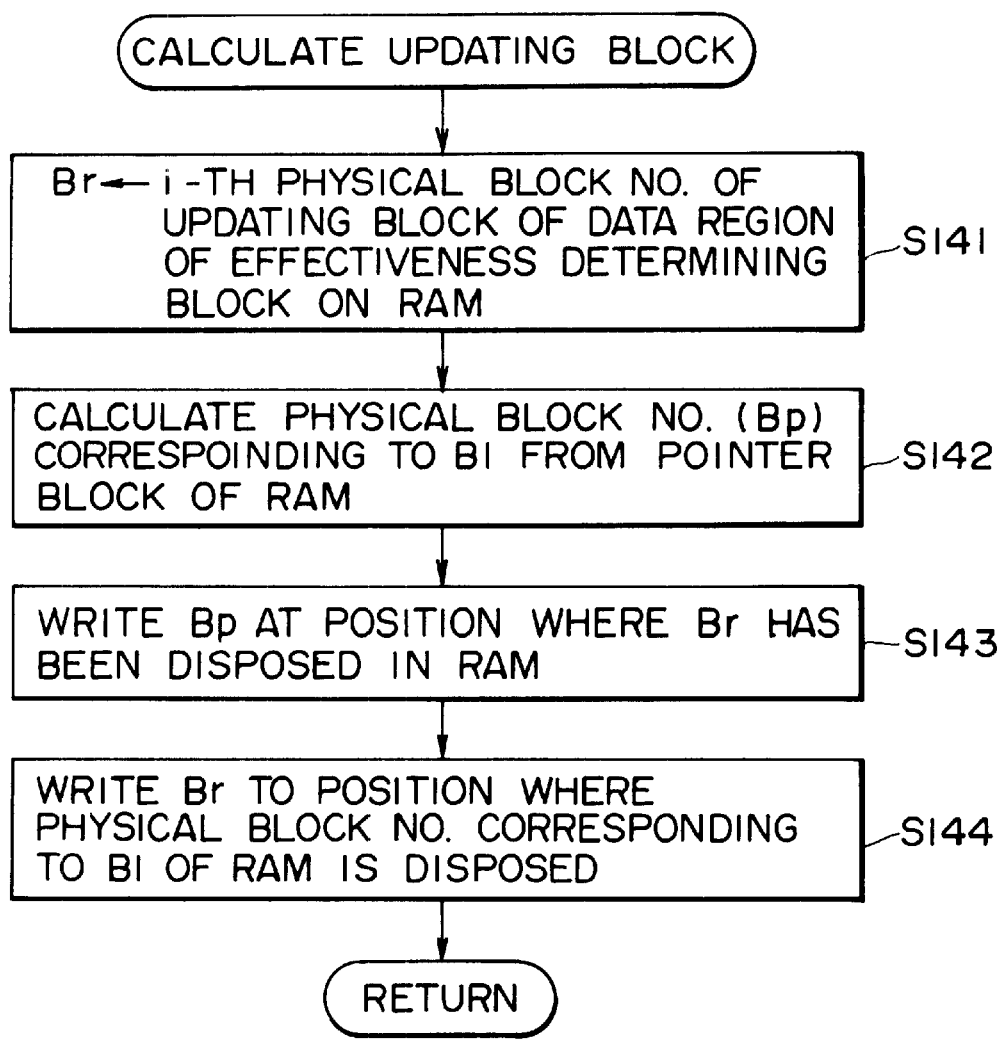
FIG. 24 is a flowchart for explaining further details of a processing at step S123 of FIG. 23.

That is, at step S123, as shown by a flowchart of FIG. 24, firstly, at step S141, the sequencer 91 calculates the physical block number Br of the updating block of the data region to which data to be written to the logical block in correspondence with the logical block number B1 is actually written by referring to RAM 67. Specifically, an i-th portion from left of the effectiveness determining block stored to RAM 67 in which the physical block number of the updating block of the data region is written, is referred and the physical block number described there is set to the variable Br.

Then, the operation proceeds to step S142 and the sequencer 91 refers RAM 67 as in the case of step S103 of FIG. 21 by which the physical block number Bp which is made to correspond to the logical block number B1 is recognized.

Thereafter, at step S143, the physical block number Bp is written to a position of RAM 67 where the physical block number Br of the updating block of the data region has been described, the operation proceeds to step S144, the physical block number Br is written to a position of RAM 67 where the physical block number Bp which has been made to correspond to the logical block number B1, has been described and the operation returns.

Figure 25:
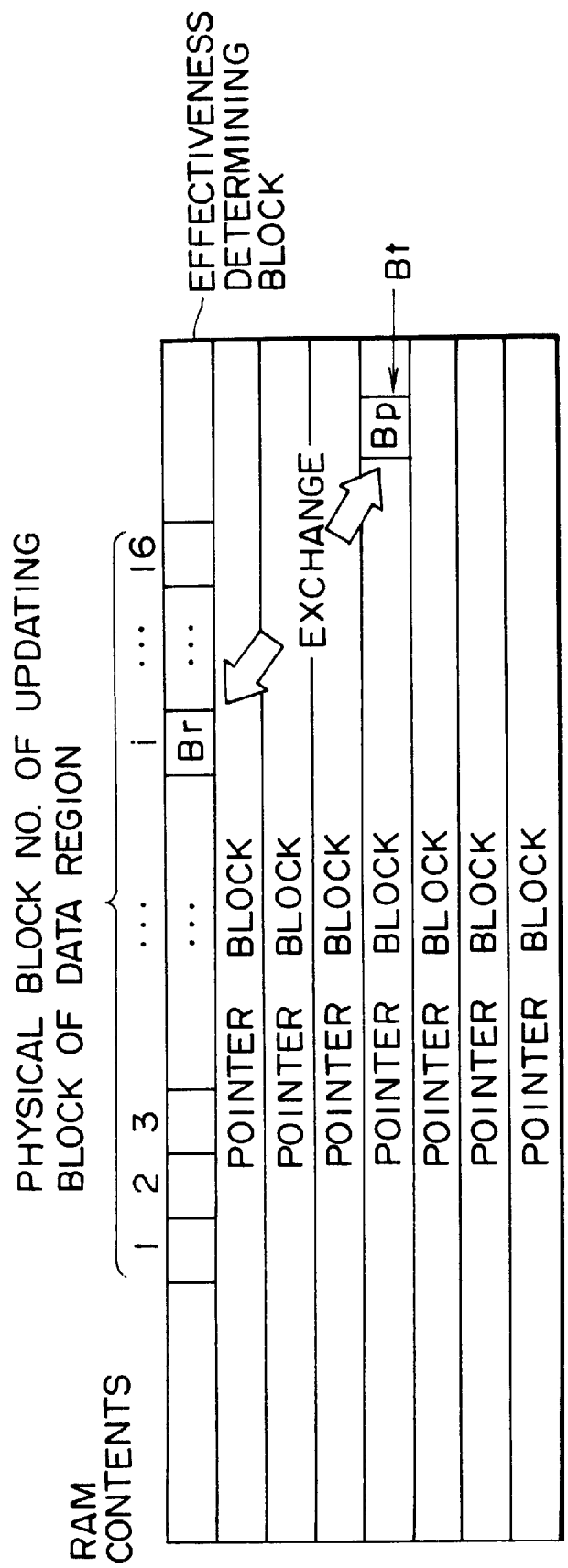
FIG. 25 is a diagram for explaining processes of steps S143 and S144 of FIG. 24.

That is, in steps S143 and S144, as shown by FIG. 25, store positions of the physical block numbers Br and Bp are exchanged by which the physical block Br which has been the updating block of the data region is changed to the data block in correspondence with the logical block B1 and the physical block Bp which has been made to correspond to the logical block B1 is changed to the updating block of the data region.

Referring back to FIG. 23, after the processing of step S123, the operation proceeds to step S124, the i-th data stored to the receiving buffer is written to the updating block Br (to be exact, physical block Br which has been the updating block of the data region and now is changed to the data block by the processing explained in reference to FIG. 24) of the data region and the operation proceeds to step S125.

At step S125, the sequencer 91 increments the variable "i" by 1, the operation proceeds to step S126 and the sequencer 91 determines whether the variable "i" is equal to or lower than"n". When it is determined in step S126 that the variable "i" is "n" or lower, that is, when data of requested block numbers has not been written, the operation returns to step S122 and processes similar to those in the above-described case are performed in later steps. Further, when it is determined in step S126 that the variable "i" is larger than "n", that is, writing of requested block numbers has been finished, the operation proceeds to step S128, the sequencer 91 sets a number of pointer blocks stored to RAM 67 in which the store content has been changed (updated), to a variable "m" by carrying out the processes of steps S122 through S126 and sets, for example, 1 to a variable "j" for counting the changed pointer blocks as an initial value.

In this case, although store content of the pointer block stored to RAM 67 is changed by the processing at step S123 (processing explained in reference to FIG. 24), when the store content of the pointer block has been changed in this way, a flag signifying the change is set to the region of RAM 67 where the pointer block is stored and in step S128, a number of the pointer blocks where the store content has been changed is recognized by referring to the flag.

Thereafter, the operation proceeds to step S129, and in the sequencer 91, for example, a j-th physical block number from top of RAM 67 in the changed pointer blocks, is set to the variable Bn. Further, at step S130, the sequencer 91 carries out a processing of recognizing the physical block number Bn of the pointer block storing the physical block number of the physical block that is originally to be written with data by referring to RAM 67 and changing the pointer block Bn to the updating block of the pointer region.

Figure 26:
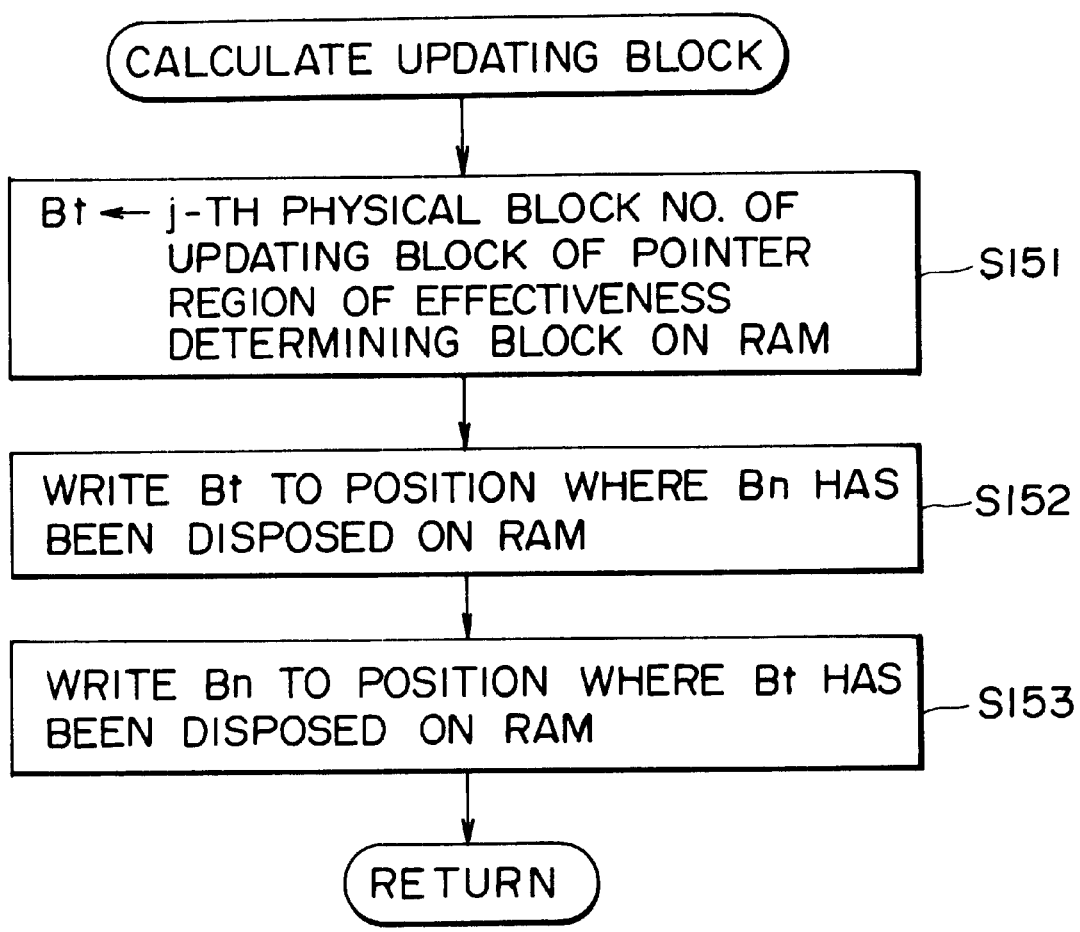
FIG. 26 is a flowchart for explaining further details of a processing at step S130 of FIG. 23.

That is, at step S130, as shown by a flowchart of FIG. 26, firstly, at step S151, the sequencer 91 calculates the physical block number Bt of the updating block of the pointer region for changing to a new pointer block by referring to RAM 67. Specifically, a j-th portion from left of the effectiveness determining block stored to RAM 67 where the physical block number of the updating block of the pointer region is described, is referred and the physical block number described there is set to the variable Bt.

Further, at step S152, the sequencer 91 writes the physical block number Bt at a position of RAM 67 where the physical block number Bn of the pointer block is described, the operation proceeds to step S153, the physical block number Bn is written to a position of RAM 67 where the physical block number Bt of the updating block of the pointer region has been described and the operation returns.

Figure 27:
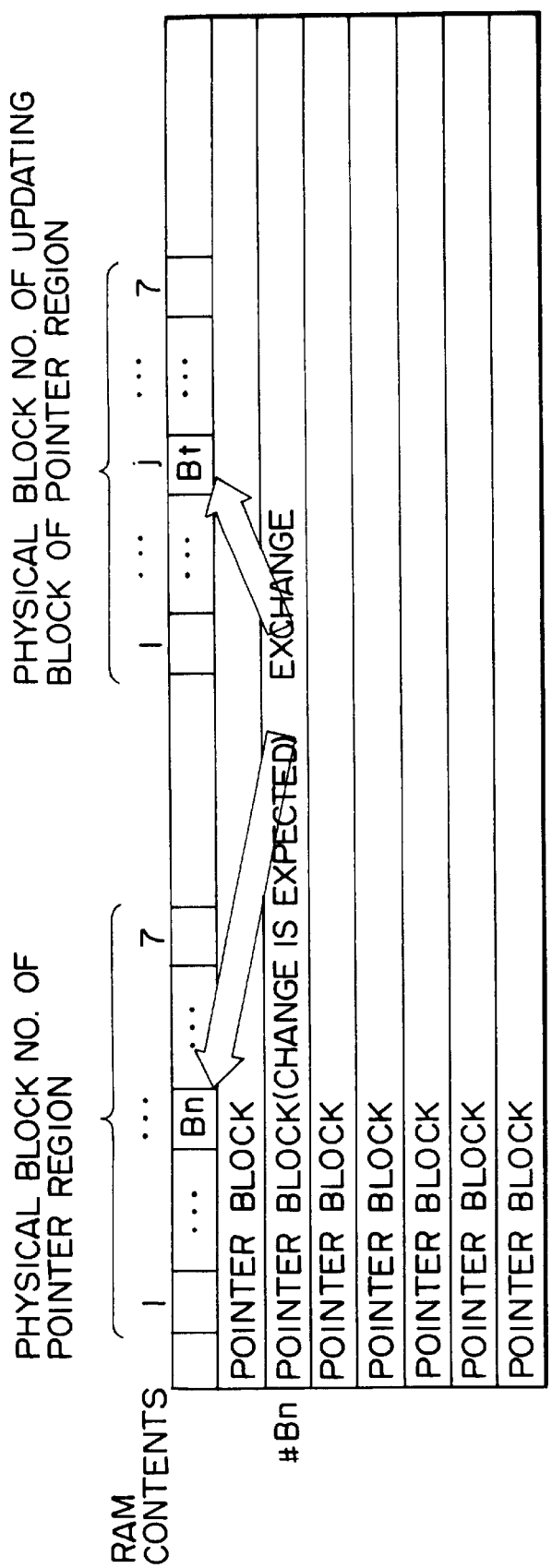
FIG. 27 is a diagram for explaining processes at steps S152 and S153 of FIG. 26.
Figure 28:
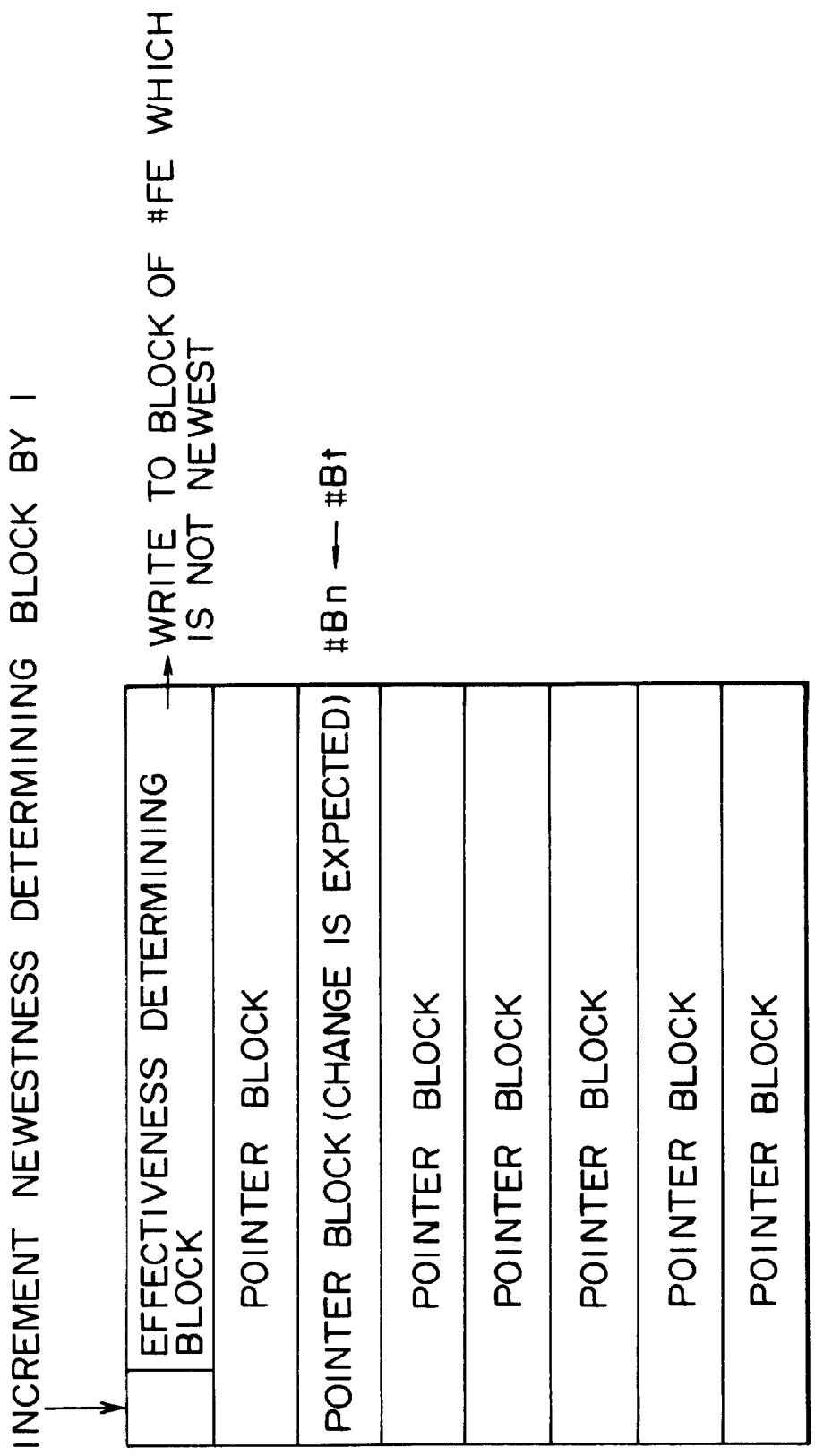
FIG. 28 is a diagram for explaining a processing at step S135 of FIG. 23.

That is, in steps S152 and S153, as shown by FIG. 27, store positions of the physical block numbers Bn and Bt are exchanged by which the physical block Bt which has been the updating block of the pointer region is changed to the pointer block and the physical block Bn which has been the pointer block is changed to the updating block of the pointer region.

Referring back again to FIG. 23, after the processing of step S130, the operation proceeds to step S131, the sequencer 91 copies a j-th one from top in updated pointer blocks of RAM 67 to the updating block Bt of the pointer region stored to EEPROM 66 and the operation proceeds to step S132. At step S132, the sequencer 91 increments the variable "j" by 1, the operation proceeds to step S133, and whether the variable "j" is "m" or lower is determined. When it is determined in step S133 that the variable "j" is "m" or lower, that is, the processing in respect of all of the updated pointer blocks has not been finished, the operation returns to step S129 and processes similar to those in the above-described case are carried out in later steps. Further, when it is determined in step S133 that the variable "j" is larger than "m", that is, the processing with respect to all of the changed pointer blocks has been finished, the operation proceeds to step S134 and the sequencer 91 increments by 1 a 1st byte of data unit as a newest information of the effectiveness determining block stored to RAM 67.

Further, according to the embodiment, as described above, as a newest information, three values of 0, 1 and 2 are successively used, and when the value obtained as a result of preceding increment of the newest information is 2, at step S134, the newest information is changed to 0.

After the processing at step S134, the operation proceeds to step S135, the sequencer 91 makes the parity calculating unit 93 calculate RS code to be written to the parity unit of the effectiveness determining block stored to RAM 67 and the operation proceeds to step S136. At step S136, the sequencer 91 overwrites the effectiveness determining block stored to RAM 67 at a position of the effectiveness determining block which is stored to EEPROM 66 and which has not been selected at step S81 of initializing processing (FIG. 18) and the operation proceeds to step S137. At step S137, in the sequencer 91, a control of transmitting write finish information showing that writing of data has normally been finished to R/W 1 is carried out and the writing processing is finished.

As described above, after finishing writing operation in respect of data region and after finishing writing operation in respect of pointer region where pointers for physical blocks constituting the data region are stored, store content of the effectiveness determining block (first or second region) storing pointers in respect of physical blocks constituting the pointer region, is updated and therefore, physical memory corruption in physical blocks of 1 or more can be dealt with. That is, not only memory corruption of one physical block constituting a data region can be dealt with but also memory corruption of a plurality of physical blocks can be dealt with.

Further, as described above, the effectiveness determining block and information stored to the pointer region serve as a conversion table for converting the logical block number in the data region into the physical block number and accordingly, when a hazard is caused in the midst of writing operation in respect of the effectiveness determining block or the pointer region, although logical memory corruption is caused, such a logical memory corruption can be dealt with.

As a result, even when a hazard is caused in the midst of writing a plurality of related data and memory corruption is caused, the memory corruption can effectively be dealt with in which the compatibility of the plurality of data is maintained.

As described above, although an explanation has been given of a case where the present invention is applied to the non-contact card system, otherwise, the present invention is applicable to storing means of a memory or the like or all devices to which data is written. However, the present invention is particularly useful in a system where transmission and reception of data is carried out in a so-called unstable state as in, for example, the above- described non-contact card system, or, even with a contact type, a system where a user can freely insert or draw an IC card or the like.

Further, according to the embodiment, although the physical block number of the updating block of the pointer region or the physical block number of the updating block of the data region is respectively stored to the effectiveness determining block or the pointer region as so-called vacant regions of the pointer region or the data region, the physical block numbers of the updating blocks need not to store necessarily. However, when the physical block number of the updating block is not stored, in writing data, the physical block for constituting the updating block must be detected by searching store content of EEPROM 66 and accordingly, it is preferable to store the physical block number of the updating block in view of high speed formation of processing.

Further, according to the embodiment, although a region for storing the effectiveness determining block, the pointer region and the data region are allocated to predetermined positions on EEPROM 66, the positions for allocating these regions are not particularly limited. Furthermore, these regions need not to secure as regions in a continuous range on EEPROM 66. That is, respectives of the region for storing the effectiveness determining block, the pointer region or the data region can be secured at noncontinuous positions on EEPROM 66.

Further, according to the embodiment, only store content at a preceding time is held in EEPROM 66, otherwise, for example, store content at a preceding time and at a time preceding to the preceding time can be held. However, in this case, a further store capacity is needed.

What is claimed is:

1. A data processing method using a memory for storing original information and updated information in block units, the memory comprising:

a data region for storing a plurality of data blocks and a plurality of updating blocks; and first and second pointer regions for storing block numbers allocated to said data blocks and said updating blocks;

the data processing method comprising the steps of:

writing data corresponding to said updated information to one or more of the updating blocks corresponding to the one or more updating block numbers allocated to the one or more updating blocks and stored in one of said first and second pointer regions; and storing the one or more updating block numbers allocated to the one or more updating blocks to the other of said first and second pointer regions such that said one or more updating block numbers stored in the other of said first and second pointer regions point to one or more data blocks, and storing one or more data block numbers stored in said one of said first and second pointer regions and corresponding to the one or more data blocks in which said original information was written, to the other of said first and second pointer regions such that said one or more data block numbers stored in the other of said first and second pointer regions point to one or more updating blocks.

2. The data processing method according to claim 1:

wherein the first region and the second region also store newest information in respect of newness or effectiveness of stored content, said data processing method further comprising the steps of:

selecting one region of the first region and the second region based on the newest information and the effectiveness information; and wherein the writing step includes writing data, said data originally to be written to one or more of the data blocks in correspondence with the block numbers stored to the selected one region, to one or more of the updating blocks.

3. The data processing method according to claim 2, further comprising the steps of:

storing the block numbers of one or more of the updating blocks to which the data has been written to the other of the first region and the second region; and updating the newest information and the effectiveness information in the other of the first region and the second region.

4. The data processing method according to claim 3, further comprising the steps of:

selecting either of the first region and the second region based on the newest information and the effectiveness information; and reading the data stored to the data blocks in correspondence with the block numbers stored to the selected region.

5. The data processing method according to claim 1, further comprising the steps of:

storing block numbers of the data blocks which were originally to be written with the data to blocks; and the other of the first region and the second region.

6. The data processing method according to claim 5, wherein the writing step includes writing data, which was originally to be written to one or more of the data blocks in correspondence with the block numbers stored to one of the first region and the second region, to one or more of the updating blocks in correspondence with the block numbers stored to that region.

7. A data processing apparatus for carrying out data processing by using a memory for storing original information and updated information in block units, said memory comprising:

a data region for storing a plurality of data blocks and a plurality of updating blocks; and first and second pointer regions for storing block numbers allocated to said data blocks and said updating blocks;

the data processing apparatus comprising:

data writing means for writing data corresponding to said updated information to one or more of the updating blocks corresponding to the one or more updating block numbers allocated to the one or more updating blocks and stored in one of the first and second pointer regions; and block number writing means for storing the one or more updating block numbers allocated to the one ore more updating blocks to the other of said first and second pointer regions such that the one or more updating block numbers stored in the other of said first and second pointer regions point to one or more data blocks, and storing one or more data block numbers stored in said one of said first and second pointer regions and corresponding to the one or more data blocks in which said original information was written, to the other of said first and second pointer regions such that said one or more data block numbers stored in the other of said first and second pointer regions point to one or more updating blocks.

8. An information processing method using storing means for storing information by a predetermined block unit, said storing means comprising at least:

a data region for storing data by the predetermined block unit, the data region comprising a plurality of data blocks and a plurality of updating blocks;

a block number region for storing block numbers allocated to the data and updating blocks by the block unit;

a first region and a second region for storing a plurality of block numbers of blocks constituting the block number region, said information processing method comprising the steps of:

writing updated data to one or more of the updating blocks, said data corresponding to data originally written to one or more of the data blocks in correspondence with block numbers stored to one region of either the first region and the second region;

writing the block numbers of the updating blocks to which the updated data have been written, to updating blocks in the block number region;

storing the block numbers of the block number region updating blocks in the other region of the first region and the second region; and with each writing of data to the data region updating blocks, successively changing the updating blocks to which data have been written to data blocks, and changing the data blocks in which the data corresponding to the data written to the updating blocks were originally written to updating blocks, thereby preventing corruption of data blocks during the writing data step.

9. The information processing method according to claim 8:

wherein the first region and the second region also store newest information or effectiveness information with respect to newness or effectiveness of stored content, said information processing method further comprising the steps of:

selecting one of the first region and the second region based on the newest information and the effectiveness information; and wherein the writing data step includes writing the data, said data originally to be written to one or more of the data blocks of the data region in correspondence with the block numbers stored to the selected one of the first region and the second region, to one or more of the updating blocks of the data region.

10. The information processing method according to claim 9, further comprising the step of:

updating the newest information and the effectiveness information in the other of the first region and the second region.

11. The information processing method according to claim 9, further comprising the steps of:

selecting either of the first region and the second region based on the newest information and the effectiveness information; and reading the data stored to the data blocks of the data region in correspondence with the block numbers stored to the selected region.

12. The data information processing method according to claim 8, further comprising the steps of:

changing the data blocks of the data region which were originally to be written with the data to updating blocks of the data region and writing the block numbers thereof to the updating blocks of the block number region; and storing the block numbers of the updating blocks of the block number region to which the block numbers of the updating blocks of the data region have been written, to the other of the first and the second region.

13. The information processing method according to claim 12, wherein the writing data step includes writing data said, data originally to be written to one or more of the data blocks in correspondence with the block numbers stored to one of the first region and the second region, to one or more of the updating blocks in correspondence with the block numbers stored to the other region of the first region and the second region.

14. An information processing apparatus for carrying out data processing using storing means for storing information by a predetermined block unit, said storing means comprising at least:

a data region storing data by the predetermined block unit, the data region comprising a plurality of data blocks and plurality of updating blocks;

a block number region storing block numbers allocated to the data and updating blocks by the block unit; and a first region and a second region for storing a plurality of block numbers of blocks constituting the block number region, said information processing apparatus comprising:

data writing means for writing updated data to one or more of the updating blocks, wherein said updated data correspond to said data originally written to one or more of the data blocks in correspondence with the block numbers stored to one of either the first region and the second region;

first block number writing means for writing, successively with each writing of data to the updating blocks, the block numbers of the updating blocks to which the data has been written to updating blocks of said block number region; and second block number writing means for making the other of the first region and the second region store the block numbers of the updating blocks of the block number region to which the block numbers of the updating blocks have been written as data blocks in the block region.

* * * * *